(12) United States Patent  
Nakaoka

(10) Patent No.: US 12,115,998 B2  
(45) Date of Patent: Oct. 15, 2024

(54) CONDITIONING SYSTEM, STIMULUS APPLYING SYSTEM, CONDITIONING METHOD, STIMULUS APPLYING METHOD, NON-TRANSITORY STORAGE MEDIUM, AND MOBILE OBJECT

(71) Applicant: Panasonic Intellectual Property Management Co., Ltd., Osaka (JP)

(72) Inventor: Hideaki Nakaoka, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 457 days.

(21) Appl. No.: 17/486,255

(22) Filed: Sep. 27, 2021

(65) Prior Publication Data

US 2022/0009506 A1    Jan. 13, 2022

Related U.S. Application Data

(63) Continuation of application No. PCT/JP2020/007872, filed on Feb. 26, 2020.

(30) Foreign Application Priority Data

Mar. 28, 2019 (JP) ................. 2019-065088

(51) Int. Cl.  
*B60W 50/00* (2006.01)  
*B60H 1/00* (2006.01)  
(Continued)

(52) U.S. Cl.  
CPC ..... *B60W 50/0097* (2013.01); *B60H 1/00742* (2013.01); *B60Q 3/80* (2017.02); *B60R 16/037* (2013.01); *G06N 5/02* (2013.01)

(58) Field of Classification Search  
CPC .............. B60H 1/0074; B60Q 2500/20; B60R 16/037; B60W 50/0097; G06N 3/006; G06N 7/01  
(Continued)

(56) References Cited

U.S. PATENT DOCUMENTS

2003/0142504 A1    7/2003  Mueller et al.  
2008/0119994 A1    5/2008  Kameyama  
(Continued)

FOREIGN PATENT DOCUMENTS

JP    08-113098    5/1996  
JP    2001-328486    11/2001  
(Continued)

OTHER PUBLICATIONS

Yagishita et al., "A Critical Time Window for Dopamine Actions on the Structural Plasticity of Dendritic Spines", Science vol. 345, issue 6204, pp. 1616-1620; DOI No. 10. 1126/science. 1255514, 2014.

(Continued)

*Primary Examiner* — Anshul Sood  
(74) *Attorney, Agent, or Firm* — GREENBLUM & BERNSTEIN, P.L.C.

(57) ABSTRACT

A conditioning system includes a prediction unit and a stimulus applying unit. The prediction unit is configured to predict, based on a state related to a user, an occurrence of an event to be caused by the state related to the user. The stimulus applying unit is configured to apply, when the prediction unit predicts that the event occurs in future, a stimulus associated with the event to the user in advance of the event.

20 Claims, 9 Drawing Sheets

(51) Int. Cl.
   *B60Q 3/80*     (2017.01)
   *B60R 16/037*   (2006.01)
   *G06N 5/02*     (2023.01)
(58) Field of Classification Search
   USPC .......................................................... 701/36
   See application file for complete search history.

(56) References Cited

U.S. PATENT DOCUMENTS

| | | | |
|---|---|---|---|
| 2013/0054049 A1* | 2/2013 | Uno | B60W 30/18145 701/1 |
| 2013/0144470 A1* | 6/2013 | Ricci | G06F 3/017 701/2 |
| 2013/0245884 A1* | 9/2013 | Forutanpour | G01S 19/34 701/1 |
| 2016/0016454 A1* | 1/2016 | Yang | B60R 16/037 701/36 |
| 2017/0282821 A1* | 10/2017 | Zych | B60R 16/037 |
| 2018/0229674 A1* | 8/2018 | Heinrich | A61B 5/18 |
| 2019/0051155 A1 | 2/2019 | Yamaguchi | |
| 2019/0176568 A1* | 6/2019 | Ostrowski | B60H 1/00742 |
| 2020/0211062 A1* | 7/2020 | Kossakovski | G06Q 30/0271 |

FOREIGN PATENT DOCUMENTS

| | | |
|---|---|---|
| JP | 2004-237891 | 8/2004 |
| JP | 2008-084802 | 4/2008 |
| JP | 2009-090929 | 4/2009 |
| JP | 4572889 | 11/2010 |
| JP | 4713808 | 6/2011 |
| JP | 5271432 | 8/2013 |
| JP | 2019-036012 | 3/2019 |

OTHER PUBLICATIONS

Official Communication issued in International Patent Application No. PCT/JP2020/007872, dated May 26, 2020, along with an English translation thereof.

* cited by examiner

CONDITIONING SYSTEM, STIMULUS APPLYING SYSTEM, CONDITIONING METHOD, STIMULUS APPLYING METHOD, NON-TRANSITORY STORAGE MEDIUM, AND MOBILE OBJECT

CROSS-REFERENCE TO RELATED APPLICATIONS

The present application is a Bypass Continuation of International Application No. PCT/JP2020/007872 filed on Feb. 26, 2020, which is based upon, and claims the benefit of priority to, Japanese Patent Application No. 2019-065088, filed on Mar. 28, 2019.

TECHNICAL FIELD

The present disclosure generally relates to a conditioning system, a stimulus applying system, a conditioning method, a stimulus applying method, a non-transitory storage medium, and a mobile object, and more particularly relates to a conditioning system, a stimulus applying system, a conditioning method, a stimulus applying method, a non-transitory storage medium, and a mobile object, which perform a conditioning between an event and a stimulus to be applied to a user.

BACKGROUND ART

Document: JP 4713808 B2 discloses an interior lighting system for a motor vehicle. In the lighting system, the color of the light emitted from the lighting device is automatically varied depending on at least one of the motor vehicle's operating parameters controlled by a vehicle occupant (user). Also in the lighting system, the color of the light is varied depending on a deviation between an instantaneous temperature in the motor vehicle interior and a setpoint temperature of the motor vehicle interior specified by the vehicle occupant. Accordingly, in the lighting system, deviations of the vehicle's inside temperature from a temperature individually preferred by the occupants may be compensated for, at least to some extent.

However, the lighting system of the above-mentioned document is required to continuously perform the lighting control for giving a desired effect to the user. This may cause a problem that a load on the system increases.

SUMMARY

It is an object of the present disclosure to provide a conditioning system, a stimulus applying system, a conditioning method, a stimulus applying method, a non-transitory storage medium, and a mobile object, which can increase the chances of giving a desired effect to the user while reducing a load on a system.

A conditioning system according to an aspect of the present disclosure includes a prediction unit and a stimulus applying unit. The prediction unit is configured to predict, based on a state related to a user, an occurrence of an event which is to be caused by the state related to the user and by which the user is to obtain a reward. The stimulus applying unit is configured to apply, when the prediction unit predicts that the event occurs in future, a stimulus associated with the event to the user in advance of the event.

A stimulus applying system according to an aspect of the present disclosure includes a prediction unit and a stimulus applying unit. The prediction unit is configured to predict, based on a state related to a user, an occurrence of an event which is to be caused by the state related to the user and by which the user is to obtain a reward. The stimulus applying unit is configured to, when the prediction unit predicts that the event occurs in future, apply, based on a conditioning data where the event and a stimulus are conditioned, the stimulus conditioned to the event to the user in advance of the event.

A conditioning method according to an aspect of the present disclosure includes a prediction step and a stimulus applying step. The prediction step includes predicting, based on a state related to a user, an occurrence of an event which is to be caused by the state related to the user and by which the user is to obtain a reward. The stimulus applying step includes applying, when in the prediction step it is predicted that the event occurs in future, a stimulus associated with the event to the user in advance of the event.

A (computer) program according to an aspect of the present disclosure is designed to cause one or more processors to perform the conditioning method described above. A non-transitory storage medium according to an aspect of the present disclosure stores the program.

A stimulus applying method according to an aspect of the present disclosure includes a prediction step and a stimulus applying step. The prediction step includes predicting, based on a state related to a user, an occurrence of an event which is to be caused by the state related to the user and by which the user is to obtain a reward. The stimulus applying step includes, when in the prediction step it is predicted that the event occurs in future, applying, based on a conditioning data where the event and a stimulus are conditioned, the stimulus conditioned to the event to the user in advance of the event.

A (computer) program according to an aspect of the present disclosure is designed to cause one or more processors to perform the stimulus applying method described above. A non-transitory storage medium according to an aspect of the present disclosure stores the program.

A mobile object according to an aspect of the present disclosure includes the conditioning system described above and a main body where the conditioning system is provided.

A mobile object according to an aspect of the present disclosure includes the stimulus applying system described above and a main body where the stimulus applying system is provided.

BRIEF DESCRIPTION OF DRAWINGS

The figures depict one or more implementations in accordance with the present teaching, by way of example only, not by way of limitations. In the figures, like reference numerals refer to the same or similar elements.

DETAILED DESCRIPTION

(1) Overview

Figure 2A:
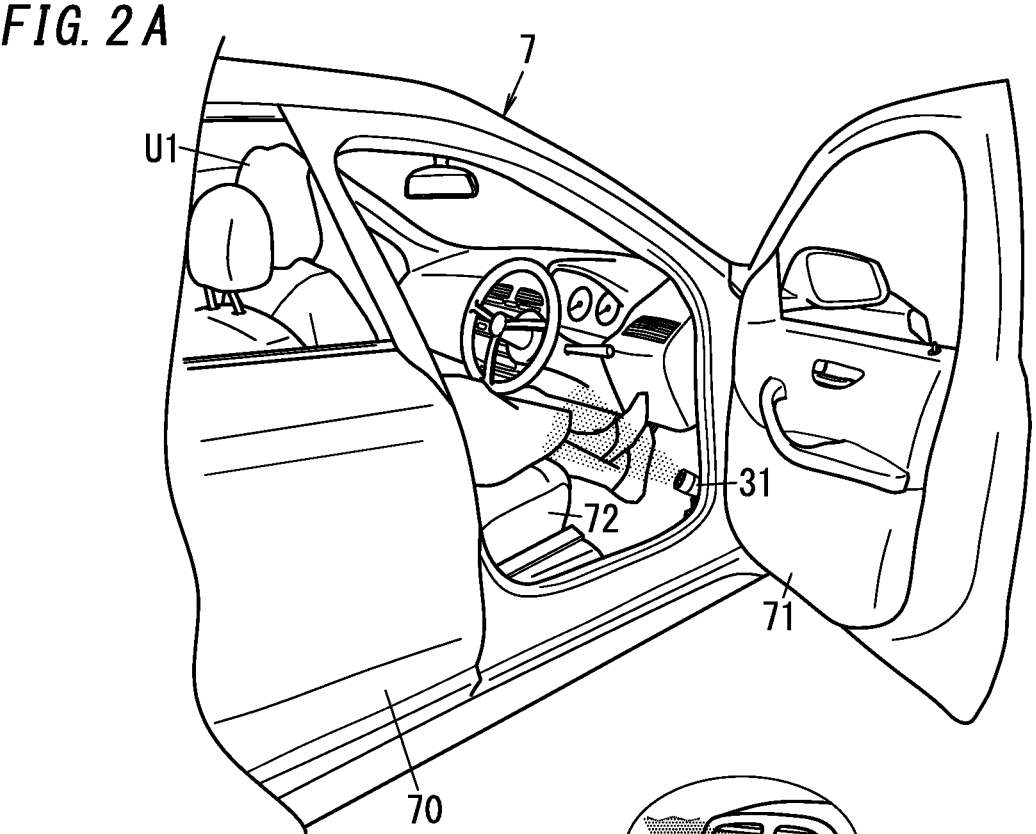
FIG. 2A is a schematic view illustrating a state where the user has opened a door of a vehicle in the conditioning system and the stimulus applying system.
Figure 2B:
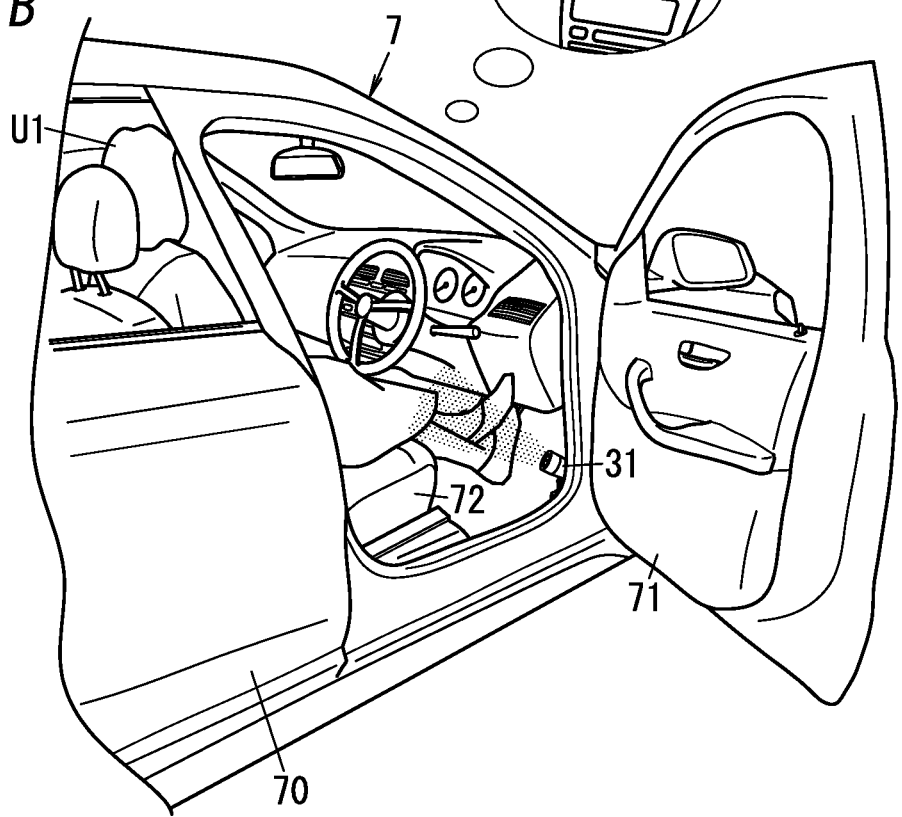
FIG. 2B is a schematic view illustrating a state where the user has opened the door in the conditioning system and the stimulus applying system.

A conditioning system 100 and a stimulus applying system 200 according to an exemplary embodiment are used for a user U1 getting on a vehicle (mobile object) 7, for example (see FIGS. 2A and 2B). The "user" mentioned in the present disclosure is assumed to be a user of the conditioning system 100 and the stimulus applying system 200, or a user of a system (the vehicle 7 in this embodiment) where the conditioning system 100 and the stimulus applying system 200 are applied. In this embodiment, the user U1 is a driver of the vehicle 7, but this is only an example and should not be construed as limiting. The user U1 may be an occupant other than the driver, of the vehicle 7.

In this embodiment, the conditioning system 100 is a system to be used for the user U1 before generation of a conditioning data (described later), i.e., until conditioning for the user U1 is completed. On the other hand, the stimulus applying system 200 is a system to be used for the user U1 after the generation of the conditioning data, i.e., after the conditioning for the user U1 is completed by the conditioning system 100. That is to say, the conditioning system 100 and the stimulus applying system 200 are used in time periods different from each other, but have the substantially same configurations.

The conditioning system 100 and the stimulus applying system 200 each include a prediction unit 11 and a stimulus applying unit 12.

The prediction unit 11 is configured to predict, based on a state related to the user U1, an occurrence of an event to be caused by the state related to the user U1. The "state related to the user" mentioned in the present disclosure includes a state of the user U1 himself or herself such as a physical condition of the user U1. Optionally, the "state related to the user" may include a state of an environment where the user U1 is placed, which would affect the state of the user U1 himself or herself. As one example, the state related to the user U1 may include the drowsiness of the user U1, and/or a difference in temperature between a temperature in the interior of the vehicle 7 where the user U1 gets on and a setting temperature of an air conditioning system 41 (described later). The "event" mentioned in the present disclosure includes a reward itself for the user U1. Optionally, the "event" may include an action or an occurrence to give the reward to the user U1. The "reward" herein is a biological reward. More specifically, the term of "reward" is used herein as a general term for a substance (such as food or water), an occurrence, a condition or an activity, which generate a positive motivation or emotion. It is well known that animals predict the reward to obtain more amount thereof and show selecting reactions or behaviors based on the prediction.

For example, when the state related to the user U1 is a state where the drowsiness of the user U1 is relatively strong, the "reward" for the user U1 is a "sleep". Accordingly, the event in this case is providing of an environment where the user U1 can get a comfortable sleep. Also for example when the state related to the user U1 is a state of an environment where the interior temperature of the vehicle 7 is at a temperature of the degree to which the user U1 feels cold, the "reward" for the user U1 is a pleasure to be obtained with the user U1 getting warm by heating. Accordingly, the event in this case is activation of a heating device.

In the conditioning system 100, the stimulus applying unit 12 is configured to apply, when the prediction unit 11 predicts that the event occurs in future, a stimulus associated with the event to the user U1 in advance of the event. In the stimulus applying system 200, the stimulus applying unit 12 is configured to apply, when the prediction unit 11 predicts that the event occurs in future, based on a conditioning data where the event and a stimulus are conditioned, the stimulus conditioned to the event to the user U1 in advance of the event. Hereinafter, unless otherwise noted, the stimulus to be applied to the user U1 by the stimulus applying unit 12 will be referred to as a "preceding stimulus."

Selecting of the reactions or the behaviors showing that the animals actually predict the reward is exactly expressed in an experiment of a selection task, such as "Classical Conditioning" or "Operant Conditioning." Examples of such as the experiment include experiments performed by I. P. Pavlov, E. L. Thorndike, B. F. Skinner and so on.

In the Classical Conditioning, it is repeated that a stimulus which is a reward such as food is applied to the animal, after any one of conditional stimuli (the preceding stimulus in this embodiment) associated with rewards in one-to-one is given to the animal. Thus, it is well known that even when the stimulus (reward) is not applied, the brain of the animal is made generate, by applying only the preceding stimulus, the reaction similar to that generated when the animal got the reward.

In the Operant Conditioning, it is repeated that a reinforcer stimulus (the reward in this embodiment) is applied with respect to a voluntary behavior (i.e., an operant behavior) of the animal, which can increase the probability that the animal causes the voluntary behavior. In the Operant Conditioning, it is especially preferred that the conditioning is performed based on the principle of the Three-Term Contingency. That is to say, it is well known that the reinforcer stimulus is repeatedly applied with respect to the voluntary behavior of the animal, only after a stimulus (i.e., a discriminative stimulus; the preceding stimulus in this embodiment) as a key to increase or decrease the voluntary behavior of the animal (i.e., the reaction), which can increase the probability that the animal causes the voluntary behavior after the preceding stimulus.

In this embodiment, the prediction unit 11 predicts the occurrence of the event, which may be the reward for the user U1, unlike the prediction of the biological reward described above. In this embodiment, when the occurrence of the event is predicted, the stimulus applying unit 12 applies the preceding stimulus to the user U1 in advance of the event.

For example, the prediction unit 11 predicts, based on the state related to the user U1, that the air conditioning system 41 is automatically activated or that the air conditioning system 41 is manually activated by the user U1. Before the air conditioning system 41 is activated, the stimulus applying unit 12 starts allowing a lighting system 31 (described later) to irradiate the user U1 with light having a certain light color, as the preceding stimulus, at a time point when the user U1 sits on a seat 72 in the vehicle 7 (see FIG. 2A). A trial described above is repeated every time the prediction unit 11 predicts that the air conditioning system 41 is activated, thereby the brain-scientifically conditioning as above being performed. Thus, even when the air conditioning system 41 is actually in a non-operating state, the brain of the user U1 is made generate, by applying only the preceding stimulus, the reaction similar to that generated when the air conditioning system 41 is in an operating state (see FIG. 2B).

Also For example, it is assumed that a series of events that the user U1 manually activates the air conditioning system 41 after the preceding stimulus is applied to the user U1 is repeated every time the prediction unit 11 predicts that the air conditioning system 41 is activated. After repeating the series of events, applying the preceding stimulus to the user U1 can increase the probability that the user U1 expects the reward to be obtained by operating of the air conditioning system 41 and manually operates the air conditioning system 41. Also in this case, even when the air conditioning system 41 is actually in the non-operating state, the brain of the user U1 is made generate, by applying only the preceding stimulus, the reaction similar to that generated when the air conditioning system 41 is in the operating state. That is to say, the event may include two system operations: one system operation to be caused by the behavior of the user U1 when the Operant Conditioning is performed with the Three-Term Contingency by using the preceding stimulus and the event; and the other system operation to be caused by the operant behavior of the user U1 in a state where the Operant Conditioning with the Three-Term Contingency has been already completed.

As described above, in this embodiment, the preceding stimulus is applied to the user U1 in advance of the event, which can make the user U1 actually feel that the reward is obtained by the occurrence of the event at a stage before the event occurs. Thus, in this embodiment, applying continuously to the user U1 a stimulus separately from the preceding stimulus is not needed. As a result, this embodiment has the advantages of increasing the chances of giving a desired effect (reward) to the user U1 while reducing a load on a system (the conditioning system 100 and the stimulus applying system 200).

(2) Details

Hereinafter, a conditioning system 100 and a stimulus applying system 200 according to an exemplary embodiment will be described with reference to FIG. 1 in more detail. In this embodiment, the conditioning system 100 and the stimulus applying system 200 are mounted on a main body 70 of a vehicle (mobile object) 7 (see FIGS. 2A and 2B). As one example, the conditioning system 100 and the stimulus applying system 200 are provided for a dashboard of the main body 70 of the vehicle 7. In other words, the mobile object 7 includes the conditioning system 100 and the main body 70 where the conditioning system 100 is provided. Also the mobile object 7 includes the stimulus applying system 200 and the main body 70 where the stimulus applying system 200 is provided.

In this embodiment, the conditioning system 100 and the stimulus applying system 200 are configured as a single system. That is to say, in this embodiment, the conditioning system 100 functions as the stimulus applying system 200 after generation of a conditioning data. Hereinafter, unless otherwise noted, the configuration of the conditioning system 100 will be mainly described, and description of the configuration of the stimulus applying system 200 will be omitted as appropriate.

Figure 1:
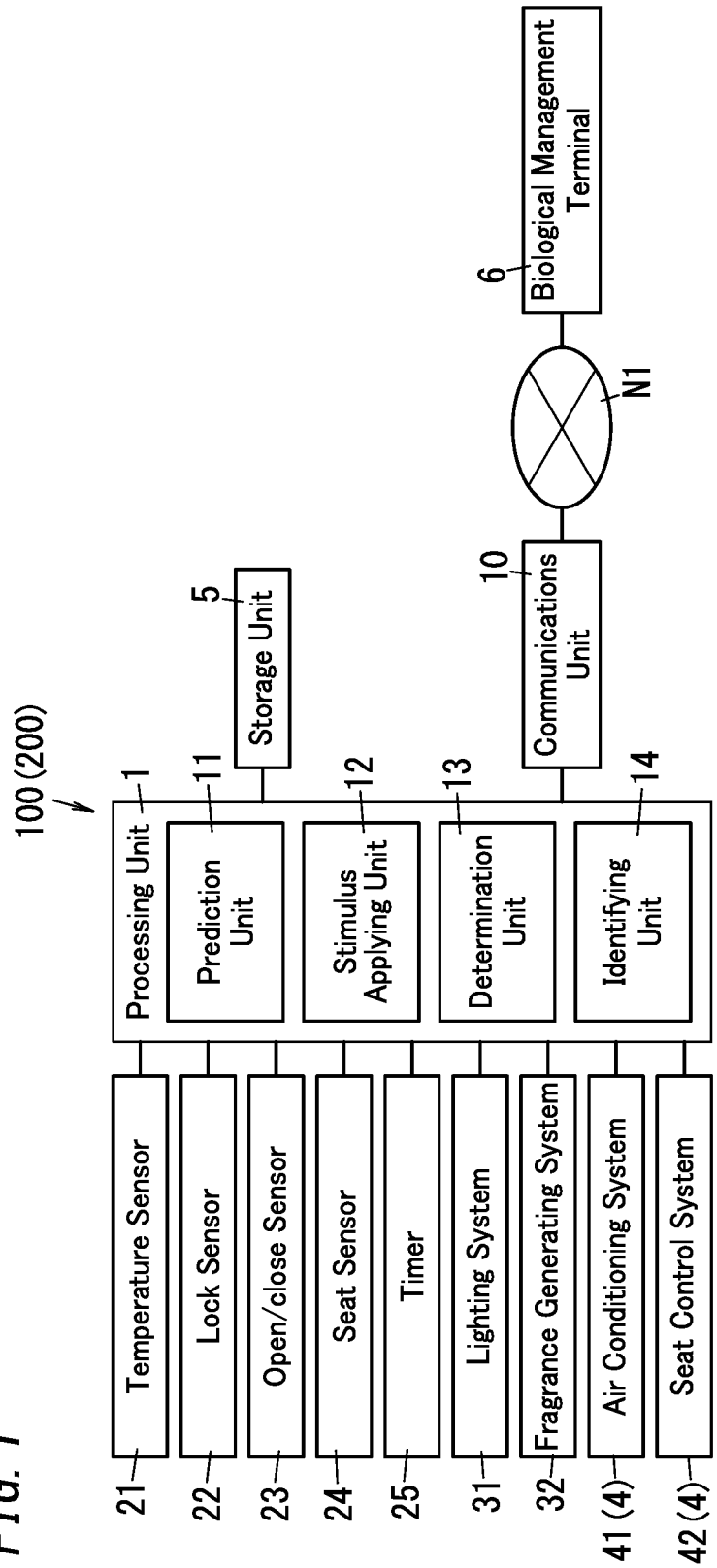
FIG. 1 is a block diagram illustrating configurations of a conditioning system and a stimulus applying system according to an exemplary embodiment of the present disclosure.

As illustrated in FIG. 1, the conditioning system 100 includes a processing unit 1, a communications unit 10 and a storage unit 5. Elements other than the processing unit 1 may be included as component elements of a system separately form the conditioning system 100 and the stimulus applying system 200.

The communications unit 10 is a communications interface capable of communicating with an external server or a portable terminal carried by the user U1 via a network N1 such as the Internet or the like. Alternatively, the communications unit 10 may be a communications interface capable of communicating with the portable terminal or a biological management terminal 6 (described later) by wireless communications adopting a radio wave for a communication medium, compliant with the standard such as the BLE (Bluetooth® Low Energy).

The processing unit 1 includes a computer system with main components, which are one or more processors and a memory as hardware. Various functions of the processing unit 1 are realized by making the one or more processors execute a program stored in the memory. The program may be stored in advance in the memory of the processing unit 1. Alternatively, the program may also be downloaded through a telecommunications line or be distributed after having been recorded in some non-transitory storage medium such as a memory card, an optical disc, or a hard disk drive, any of which is readable for the computer system.

The processing unit 1 includes a prediction unit 11, a stimulus applying unit 12, a determining unit 13 and an identifying unit 14. More specifically, the processing unit 1 makes the one or more processors execute a prescribed program(s) to provide the functions of the prediction unit 11, the stimulus applying unit 12, the determining unit 13 and the identifying unit 14.

As described above, the prediction unit 11 is configured to predict, based on a state related to the user U1, an occurrence of an event to be caused by the state related to the user U1. More specifically, the prediction unit 11 determines whether or not a plurality of conditions related to the event are all satisfied, based on detection results of two or more kinds of sensors 21 to 24 (described later), a counting result of a timer 25 (described later) and various parameters stored in the storage unit 5. In this embodiment, when determining that the plurality of conditions related to the event are all satisfied, the prediction unit 11 predicts that the event will occur in future. In this embodiment, the prediction unit 11 can therefore predict the occurrence of the event at a relatively high probability (e.g., 80% or more).

In this embodiment, the prediction unit 11 is configured to predict occurrences of two or more events. More specifically, the prediction unit 11 predicts occurrences of "starting of heating" and "starting of cooling" about an air conditioning system 41. Furthermore, the prediction unit 11 predicts an occurrence of an event of "shifting to a sleeping form" about a seat 72 (the back seat 72). The "sleeping form" mentioned in the present disclosure means a form of the seat 72 (i.e., an attitude of the seat 72) to be adopted when the user U1 takes a sleep (including a nap) on the seat 72, for example. A series of operation flows in a case where the prediction unit 11 predicts the occurrences of the events will be described in detail later in the "(3) Operation" section.

As described above, the stimulus applying unit 12 is configured to apply, when the prediction unit 11 predicts that the event occurs in future, a stimulus associated with the event to the user U1 in advance of the event. In this embodiment, as above, the prediction unit 11 predicts occurrences of two or more events. In this embodiment, the stimulus applying unit 12 changes a preceding stimulus to be applied to the user U1 in accordance with the occurrence of the event predicted by the prediction unit 11. For example, when occurrence of the "starting of heating" is predicted by the prediction unit 11, the stimulus applying unit 12 starts allowing to irradiate the user U1 with light having a certain light color associated with the "starting of heating", as the preceding stimulus. That is to say, in this embodiment, the stimulus applying unit 12 is configured to change a stimulus (preceding stimulus) to be applied to the user U1 in accordance with a kind of the event.

In the Classical Conditioning, the reward is preferably given within a short time immediately after the preceding stimulus is applied, but In the Operant Conditioning, the reward is preferably given within a short time immediately after a voluntary behavior (see Sho Yagishita et al. "A Critical Time Window for Dopamine Actions on the Structural Plasticity of Dendritic Spines", DOI number; 10.1126/science. 1255514).

In consideration of the above matter, the stimulus applying unit 12 in this embodiment estimates a start time point of the event based on a prediction result of the prediction unit 11, and controls a lighting system 31 or a fragrance generating system 32 to start applying the preceding stimulus to the user U1 before a prescribed time with respect to the start time point estimated (predicted). The prescribed time is 2 seconds for example. That is to say, in this embodiment, the stimulus applying unit 12 is configured to start applying a stimulus (preceding stimulus) to the user U1 before the prescribed time with respect to the start time point of the event predicted. The prescribed time is preferably set within a range of 0.1 seconds to 10.0 seconds, as one example.

The determining unit 13 is configured to monitor about whether or not the occurrence of the event is present within the prescribed time from a time point when the stimulus is applied to the user U1 by the stimulus applying unit 12. That is to say, the determining unit 13 is configured to determine whether or not the event occurs, after the stimulus is applied to the user U1 by the stimulus applying unit 12. In other words, the determining unit 13 determines whether or not the trial for conditioning the preceding stimulus applied to the user U1 and the event has been succeeded.

In this embodiment, the determining unit 13 counts the prescribed time from a time point when radiation of light as the preceding stimulus from the lighting system 31 is started by the stimulus applying unit 12. When a heating device or cooling of the air conditioning system 41 is activated within the prescribed time, the determining unit 13 determines that the trial has been succeeded. On the other hand, when the prescribed time elapses without the heating device or cooling of the air conditioning system 41 being activated, the determining unit 13 determines that the trial has been failed.

Also in this embodiment, the determining unit 13 counts the prescribed time from a time point when generation of fragrance as the preceding stimulus from the fragrance generating system 32 is started by the stimulus applying unit 12. When the back seat 72 is shifted to the sleeping form by a seat control system 42 within the prescribed time, the determining unit 13 determines that the trial has been succeeded. On the other hand, when the prescribed time elapses without the back seat 72 being shifted to the sleeping form by the seat control system 42, the determining unit 13 determines that the trial has been failed.

The identifying unit 14 is configured to identify the user U1. The identifying unit 14 identifies for example an owner of the vehicle 7 and the owner's family member(s) as the user(s) U1. As one example, when locking of a door 71 of the vehicle 7 is released with a key of the vehicle 7, the identifying unit 14 identifies that the key's owner (the driver of the vehicle 7 in this embodiment) previously registered is the user U1 which opened the door 71. Alternatively, the identifying unit 14 may allow a camera provided in the vehicle 7 to capture an image of the user U1 which opened the door 71, and compare the captured image with a reference image(s) previously stored to identify who the user U1 opened the door 71 is. Still alternatively, the identifying unit 14 may identify who the user U1 is, based on a communication result of the communications unit 10 communicated with the portable terminal carried by the user U1.

In this embodiment, the stimulus applying unit 12 is configured to change the stimulus (preceding stimulus) to be applied per user U1 in accordance with an identification result of the identifying unit 14. For example when the identifying unit 14 identifies that the user U1 is "Mr. XX" as one of the family members, the stimulus applying unit 12 reads out the user information of "Mr. XX" from the storage unit 5, and controls the lighting system 31 or the fragrance generating system 32 to apply to "XX" the preceding stimulus in accordance with "Mr. XX."

In this embodiment, the processing unit 1 is electrically connected with a temperature sensor 21, a lock sensor 22, an open/close sensor 23, a seat sensor 24 and a timer 25, which are provided for the vehicle 7.

The temperature sensor 21 detects a space temperature in an interior of the vehicle 7. In this embodiment, a detection result of the temperature sensor 21 is used for predicting occurrences of the events: the "starting of heating" and "starting of cooling" in the prediction unit 11.

The lock sensor 22 detects whether the door 71 is in a state locked with a key or an unlocked state. A detection result of the lock sensor 22 is used for predicting occurrences of the events: the "starting of heating", "starting of cooling" and "shifting to the sleeping form" in the prediction unit 11.

The open/close sensor 23 detects whether the door(s) 71 is opening or closing. In this embodiment, the open/close sensor 23 detects opening or closing of each of a door 71 of the driver seat, a door 71 of the passenger seat and a door 71 of the back seat. A detection result of the open/close sensor 23 is used for predicting occurrences of the events: the "starting of heating", "starting of cooling" and "shifting to the sleeping form" in the prediction unit 11.

The seat sensor 24 detects whether or not the user U1 sits on the seat 72 in the vehicle 7. In this embodiment, the seat sensor 24 detects whether or not the user U1 sits on each of the driver seat 72, the passenger seat 72 and the back seat 72. A detection result of the seat sensor 24 is used for predicting occurrences of the events: the "starting of heating", and "starting of cooling" in the prediction unit 11.

The timer 25 has not only a function as a clock but also a function of counting an elapsed time from an arbitrary time point. The timer 25 is used for predicting occurrences of the events: the "starting of heating", "starting of cooling" and "shifting to the sleeping form" in the prediction unit 11. The timer 25 is also used for counting the prescribed time from a time point when the preceding stimulus is applied to the user U1 in the stimulus applying unit 12.

In this embodiment, the processing unit 1 is electrically connected with not only the lighting system 31 and the fragrance generating system 32 provided for the vehicle 7 but also the air conditioning system 41 and the seat control system 42, as an environment providing system 4. The "environment providing system" mentioned in the present disclosure is a system to provide an environment inducing the event. For example, when the event is the "starting of heating", the air conditioning system 41 corresponds to the environment providing system 4 providing an environment where heating is operated. Alternatively, for example, when the event is the "shifting to the sleeping form", the seat control system 42 corresponds to the environment providing system 4 providing an environment where the seat 72 is shifted to the sleeping form.

The lighting system 31 is a system to irradiate the interior space in the vehicle 7 with light having a certain light color. In this embodiment, the lighting system 31 includes a so-called floor illumination or the like to irradiate a floor in the vehicle 7 with indirect lighting, for example. The lighting system 31 irradiates the interior space in the vehicle 7 with light having a light color set by default in the vehicle 7 or previously set by the user U1 during a normal state without applying the preceding stimulus to the user U1. On the other hand, the lighting system 31 irradiates the interior space in the vehicle 7 with light having a certain light color different from the light colors set by default and by the user U1 during a state controlled by the stimulus applying unit 12. The light having the certain light color is accordingly radiated to the user U1, as the preceding stimulus.

The fragrance generating system 32 is a system to spray fragrance substances such as aromatic compounds into the interior space in the vehicle 7. The fragrance generating system 32 sprays, into the interior space in the vehicle 7, fragrance substances corresponding to a fragrance set by default in the vehicle 7 or previously set by the user U1 during the normal state without applying the preceding stimulus to the user U1. Alternatively, during the normal state, the fragrance generating system 32 may keep a non-activation state based on setting by default in the vehicle 7 or previously setting by the user U1. On the other hand, the fragrance generating system 32 sprays, into the interior space in the vehicle 7, fragrance substances corresponding to a certain fragrance different from the fragrances set by default and previously set by the user U1 during a state controlled by the stimulus applying unit 12. The certain fragrance is accordingly applied to the user U1, as the preceding stimulus.

The air conditioning system 41 is a system to adjust the space temperature in the vehicle 7. In this embodiment, the air conditioning system 41 may include an air conditioner as a cooling device. Also in this embodiment, the air conditioning system 41 may include an air conditioner, a steering heater, a seat heater, or a radiation type heater, as a heating device. As the heating device to be used in this embodiment, the seat heater, or a set of the seat heater and the radiation type heater is preferably used. The seat heater can give the optimum temperature feel to the user U1 quickly after activated. In this embodiment, the air conditioning system 41 starts either heating or cooling, when an accessory power supply (ACC power supply) or an ignition power supply (IG power supply) in the vehicle 7 is turned on, or when receiving a certain operation from the user U1. In the former case, the air conditioning system 41 starts either heating or cooling based on a difference in temperature between a setting temperature previously set and the space temperature in the vehicle 7 detected by the temperature sensor 21.

The seat control system 42 is a system to control a form of the seat 72 in the vehicle 7. In this embodiment, the seat control system 42 switches the form of the back seat 72 to either a normal form or the sleeping form, when receiving the certain operation from the user U1. The normal form is a form where an angle made by a backrest of the back seat 72 and the floor of the vehicle 7 is equal to or more than a prescribed angle. The normal form is used when the user U1 sits on the seat 72 in an awakening state, for example. The sleeping form is a form where the angle made by the backrest of the back seat 72 and the floor of the vehicle 7 is less than the prescribed angle. As described above, the sleeping form is used when the user U1 takes a sleep (or a nap) on the seat 72, for example.

The storage unit 5 includes, for example, an electrically rewritable non-volatile memory such as an Electrically Erasable Programmable Read-Only Memory (EEPROM), or a volatile memory such as a Random Access Memory (RAM). The storage unit 5 stores therein various parameters to be used by the prediction unit 11 to predict occurrence of the event. As one example, the storage unit 5 stores therein the current setting temperature of the air conditioning system 41, the last end time of the heating in the air conditioning system 41 and the last end time of the cooling in the air conditioning system 41. As one example, the storage unit 5 further stores therein the current form of the seat 72 in the seat control system 42 and the last end time of the sleeping form in the seat control system 42. As one example, the storage unit 5 further stores therein the light color of the normal state in the lighting system 31 and the fragrance of the normal state in the fragrance generating system 32.

The storage unit 5 further stores therein the user information per user U1 as shown in the following Table 1. In the Table 1, "Event" represents three kinds of events which may occur based on the state related to the user U1, and "Stimulus" represents three kinds of preceding stimuli to be applied to the user U1 in advance of the event. In the "Stimulus" of the Table 1, the numbers in parentheses represents modes of preceding stimuli. For example, "Light color (No. 3)", "Light color (No. 8)" and "Fragrance (No. 2)" respectively represent orange, bluish-purple, and fragrance of roses. In the Table 1, "The number of applications" represents the number of times the preceding stimulus is applied to the user U1, and "The last application time" represents the last date and time the preceding stimulus is applied to the user U1.

In the Table 1, "Threshold" represents parameters to be used by the prediction unit 11 to predict whether or not the event occurs. For example, when the event is the "starting of heating" or "starting of cooling", the "Threshold" is used to be compared with the difference in temperature between the interior temperature in the vehicle 7 and the setting temperature of the air conditioning system 41 (the heating or cooling). Also for example, when the event is the "shifting to the sleeping form", the "Threshold" is used to be compared with a sleepiness level acquired from the a biological management terminal 6 (described later). In the Table 1, "The number of success times" represents the number of times the event occurs during the prescribed time from a time point when the preceding stimulus is applied to the user U1, and "Success rate" represents by percentage a rate of the number of success times to the number of applications.

TABLE 1

| Event | Stimulus | The number of applications | The last application time | Threshold | The number of success times | Success rate |
|---|---|---|---|---|---|---|
| starting of heating | Light color (No. 3) | 50 | Jan. 5, 2018 13:00 | 0.5 | 25 | 50% |
| starting of cooling | Light color (No. 8) | 20 | Sep. 30, 2017 16:00 | 2.2 | 14 | 70% |
| shifting to the sleeping form | Fragrance (No. 2) | 10 | Dec. 10, 2017 23:00 | 80 | 8 | 80% |

The biological management terminal 6 is eyeglasses, as one example. The biological management terminal 6 includes a plurality of electrodes to be in contact with the face skin of the user U1 when worn. The biological management terminal 6 detects movement of an eyeball(s) of the user U1 depending on movement of the face skin based on the electric potential of each of the electrodes. The biological management terminal 6 then measures the sleepiness level of the user U1 based on the movement of the eyeball detected. The "sleepiness level" mentioned in the present disclosure is a parameter that the sleepiness of the user U1 is numerically expressed. The "sleepiness level" expresses that the larger its numerical value is, the stronger the sleepiness is. The biological management terminal 6 transmits a measured result of the sleepiness level to the portable terminal carried by the user U1 (e.g., a smart phone or the like), by wireless communications adopting a radio wave for a communication medium, compliant with the standard such as the BLE (Bluetooth® Low Energy). The portable terminal transmits the measured result of the sleepiness level to the communications unit 10 via the network N1 such as the Internet in accordance with a request received from the processing unit 1. Alternatively, the biological management terminal 6 may transmit the measured result of the sleepiness level directly to the communications unit 10, by wireless communications adopting a radio wave for a communication medium, compliant with the standard such as the BLE (Bluetooth® Low Energy).

(3) Operation

Hereinafter, examples about how the conditioning system 100 and the stimulus applying system 200 in this embodiment operate will be described.

(3.1) Operation of Conditioning System

First, one example about how the conditioning system 100 operates will be described with reference to FIGS. 3 to 9B. The conditioning system 100 first performs a common processing (see FIG. 3). Then the conditioning system 100 performs any of a first processing (see FIGS. 4 to 5B), a second processing (see FIGS. 6 to 7B) and a third processing (see FIGS. 8 to 9B) according to a processing result of the common processing.

(3.1.1) Common Processing

Figure 3:
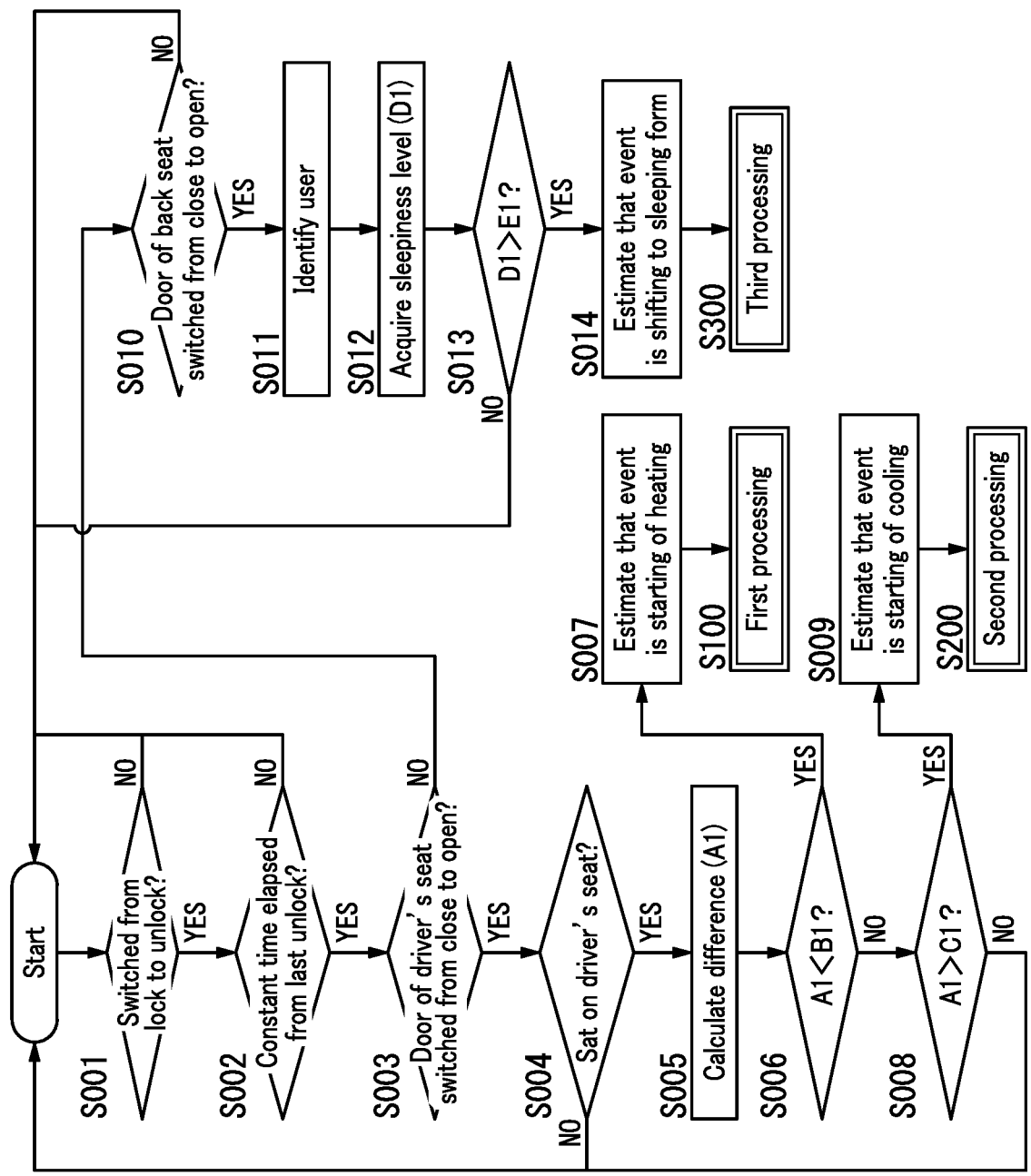
FIG. 3 is a flowchart showing an exemplary common processing in the conditioning system.

As illustrated in FIG. 3, in the common processing, the prediction unit 11 monitors about whether or not the door 71 is switched from the locked state to the unlocked state based on the detection result of the lock sensor 22 (in S001). If the door 71 is switched from the locked state to the unlocked state (if the answer is Yes in S001), the prediction unit 11 determines whether or not a constant time elapses from the last end time of the unlocked state (in S002). If the constant time elapses from the last end time (if the answer is Yes in S002), the prediction unit 11 determines that the user U1 is about to get on the vehicle 7. The processing steps S001 and S002 are performed to exclude the following two cases: a first case that the user U1 drove the vehicle 7 is away temporarily from the seat; and a second case that the user U1 loads luggage onto the vehicle 7 or unloads it from the vehicle 7.

Next, the prediction unit 11 monitors about whether or not the door 71 of the driver seat is switched from the closed state to the opened state based on the detection result of the open/close sensor 23 (in S003). If the door 71 of the driver seat is switched from the closed state to the opened state (if the answer is Yes in S003), the prediction unit 11 monitors about whether or not the user U1 sits on the driver seat 72 based on the detection result of the seat sensor 24 (in S004). If the user U1 sits on the driver seat 72 (if the answer is Yes in S004), the prediction unit 11 determines that the user U1 (i.e., the driver herein) is about to drive the vehicle 7. The prediction unit 11 then calculates a difference A1 in temperature between the current setting temperature of the air conditioning system 41 and the current temperature in the interior of the vehicle 7 based on the detection result of the temperature sensor 21 (in S005).

Next, the prediction unit 11 compares the difference A1 in temperature with a threshold B1 for the "starting of heating" (in S006). If the threshold B1 is more than the difference A1 in temperature (if the answer is Yes in S006), the prediction unit 11 estimates that the event is the "starting of heating" (in S007), and then the conditioning system 100 performs the first processing (in S100). On the other hand, if the threshold B1 is not more than the difference A1 in temperature (if the answer is No in S006), the prediction unit 11 compares the difference A1 in temperature with a threshold C1 for the "starting of cooling" (in S008). If the threshold C1 is less than the difference A1 in temperature (if the answer is Yes in S008), the prediction unit 11 estimates that the event is the "starting of cooling" (in S009), and then the conditioning system 100 performs the second processing (in S200).

In the processing step S003, if the door 71 of the driver seat is NOT switched from the closed state to the opened state (if the answer is No in S003), the prediction unit 11 monitors about whether or not the door 71 of the back seat is switched from the closed state to the opened state (in S010). If the door 71 of the back seat is switched from the closed state to the opened state (if the answer is Yes in S010), the prediction unit 11 determines that the user U1 (i.e., the passenger herein) is about to sit on the back seat. The prediction unit 11 then identifies the user U1 based on the identification result of the identifying unit 14 (in S011). Also the prediction unit 11 communicates with the portable terminal or the biological management terminal 6 carried by the user U1 via the communications unit 10 to acquire a sleepiness level D1 of the user U1 (in S012).

Next, the prediction unit 11 compares the sleepiness level D1 with a threshold E1 for the "shifting to the sleeping form" (in S013). If the sleepiness level D1 is more than the threshold E1 (if the answer is Yes in S013), the prediction unit 11 estimates that the event is the "shifting to the sleeping form" (in S014), and then the conditioning system 100 performs the third processing (in S300).

In each of the processing steps S001, S002, S004, S008, S010 and S013, if a corresponding condition is NOT satisfied, the common processing is repeated without shifting to any of the first processing (in S100), the second processing (in S200) and the third processing (in S300).

(3.1.2) First Processing

Figure 4:
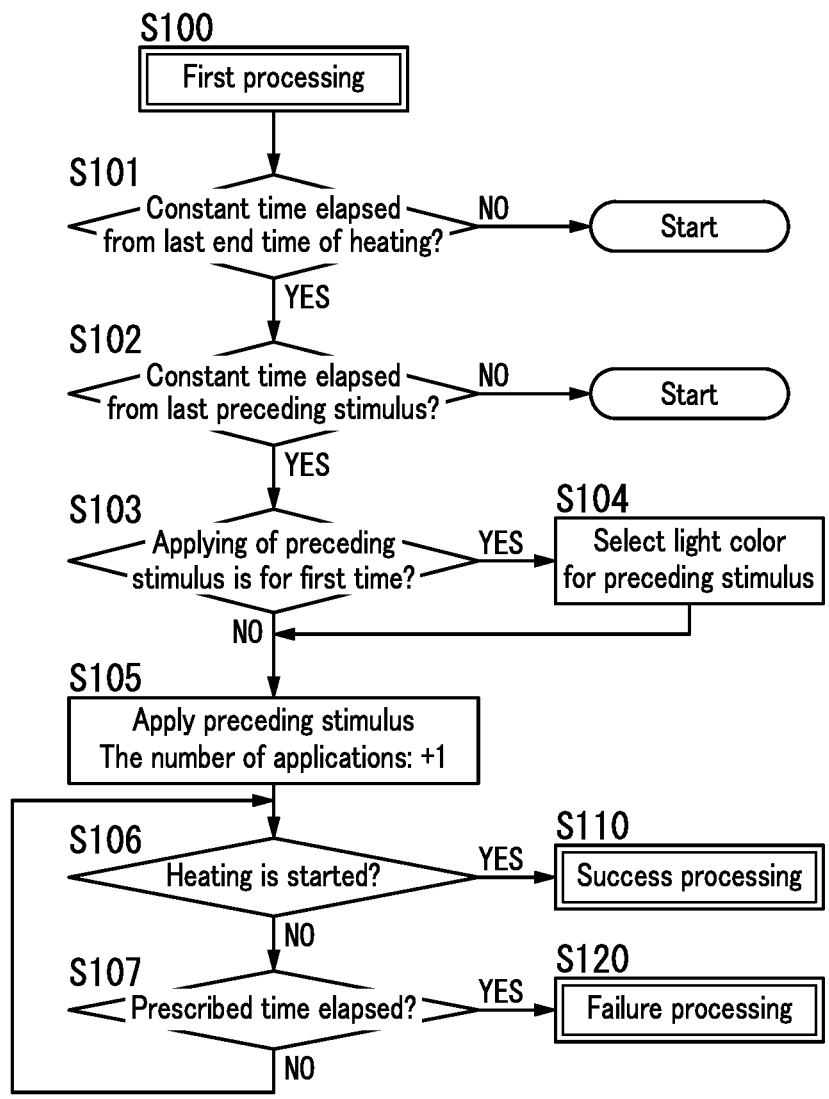
FIG. 4 is a flowchart showing an exemplary first processing in the conditioning system.

As illustrated in FIG. 4, in the first processing (in S100), the prediction unit 11 first determines whether or not a constant time elapses from the last end time of the heating (in S101). The processing steps S101 is performed to exclude a case that the heating was being used until immediately before performing of the first processing. If the constant time elapses from the last end time (if the answer is Yes in S101), the prediction unit 11 determines whether or not a constant time elapses from the last application time of the preceding stimulus (in S102). The processing steps S102 is performed to exclude a case that the preceding stimulus was being applied to the user U1 until immediately before performing of the first processing. If the constant time elapses from the last application time (if the answer is Yes in S102), the prediction unit 11 predicts that the event of the "starting of heating" will occur. In the first processing, when the preceding stimulus is applied to the user U1 for the first time, the prediction unit 11 regards that the constant time elapses.

When the prediction unit 11 predicts that the event of the "starting of heating" will occur, the stimulus applying unit 12 determines whether or not the preceding stimulus is applied to the user U1 for the first time now (in S103). If applying of the preceding stimulus is for the first time (if the answer is Yes in S103), the stimulus applying unit 12 selects a light color of light to be radiated from the lighting system 31, as the preceding stimulus (in S104). If applying of the preceding stimulus is NOT for the first time (if the answer is No in S103), or if applying of the preceding stimulus is for the first time and the light color has been selected, the stimulus applying unit 12 controls the lighting system 31 to apply the preceding stimulus to the user U1 by radiating the light with the light color, as the preceding stimulus, to the user U1 (in S105). At this time, the determining unit 13 increments the number of applications of the preceding stimulus regarding the event of the "starting of heating" in the user information of the user U1 (in S105).

After that, when the ACC power supply or the IG power supply of the vehicle 7 is turned on and the heating is started in accordance with the automatic mode or the manual operation for starting the heating, received from the user U1 (if the answer is Yes in S106), the determining unit 13 determines that the trial for conditioning the preceding stimulus and the event has been succeeded, and then the conditioning system 100 performs a success processing (in S110). On the other hand, if the prescribed time elapses without the heating being started (if the answer is No in S106, and Yes in S107), the determining unit 13 determines that the trial for conditioning the preceding stimulus and the event has been failed, and then the conditioning system 100 performs a failure processing (in S120).

In each of the processing steps S101 and S102, if a corresponding condition is NOT satisfied, the common processing is repeated without shifting to any of the success processing (in S110) and the failure processing (in S120).

Figure 5A:
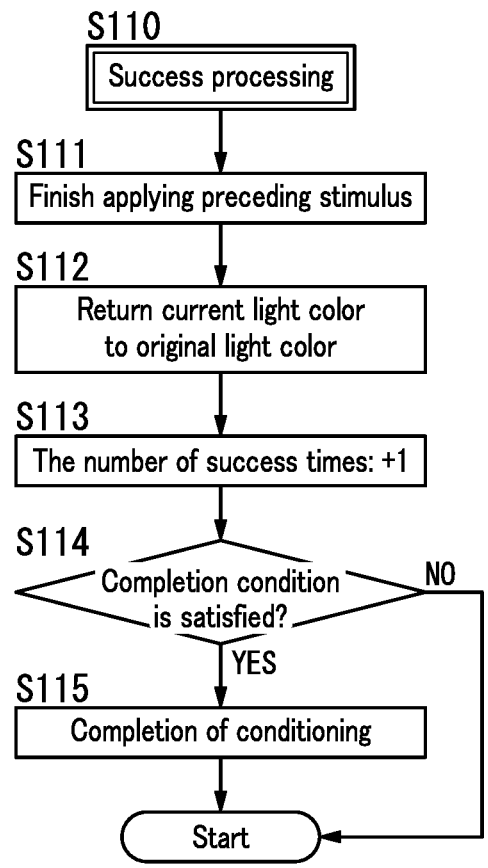
FIG. 5A is a flowchart showing an exemplary success processing of the first processing in the conditioning system.

As illustrated in FIG. 5A, in the success processing (in S110), the stimulus applying unit 12 controls, at a timing when the event is started, the lighting system 31 to finish (stop) applying the preceding stimulus to the user U1 (in S111). That is to say, the stimulus applying unit 12 controls the lighting system 31 to return the current light color to the original light color (the light color in the normal state) (in S112). At this time, the determining unit 13 increments the number of success times regarding the event of the "starting of heating" in the user information of the user U1 (in S113). Alternatively, the stimulus applying unit 12 may control the lighting system 31 to finish the preceding stimulus before the timing when the event is started, and in this case, may shift to waiting condition determination of the processing steps S106 and S107 in a state where the preceding stimulus is finished.

The determining unit 13 then determines whether or not a completion condition for the conditioning is satisfied with reference to the user information of the user U1 (in S114). The "completion condition" mentioned herein is a condition that the number of success times is equal to or more than the prescribed number of times (e.g., 50 times) and furthermore the success rate is equal to or more than a prescribed value (e.g., 80%), for example. If the completion condition is satisfied (the answer is Yes in S114), the determining unit 13 determines that the conditioning regarding the event of the "starting of heating" has been completed (in S115). At this time, the determining unit 13 allows the storage unit 5 to store, as the conditioning data hereinafter, the user information of the user U1 that the conditioning regarding the event of the "starting of heating" has been completed.

Figure 5B:
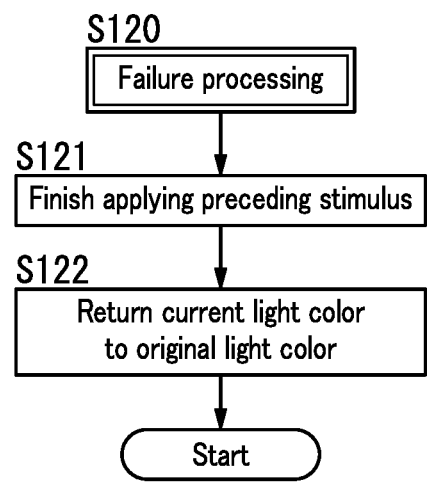
FIG. 5B is a flowchart showing an exemplary failure processing of the first processing in the conditioning system.

As illustrated in FIG. 5B, in the failure processing (in S120), the stimulus applying unit 12 controls, after the prescribed time elapsed, the lighting system 31 to finish (stop) applying the preceding stimulus to the user U1 (in S121). That is to say, the stimulus applying unit 12 controls the lighting system 31 to return the current light color to the original light color (the light color in the normal state) (in S122).

After the success processing (in S110) or the failure processing (in S120) is performed, the common processing is repeated.

In the processing steps S106 to S122 described above, radiation of light with the light color as the preceding stimulus is finished immediately, after the prescribed time elapses from start of applying the preceding stimulus, or after the event (heating) is started. The preceding stimulus may be finished by a time shorter than the prescribed time, if it is a stimulus which can be perceived by the user U1.

(3.1.3) Second Processing

Figure 6:
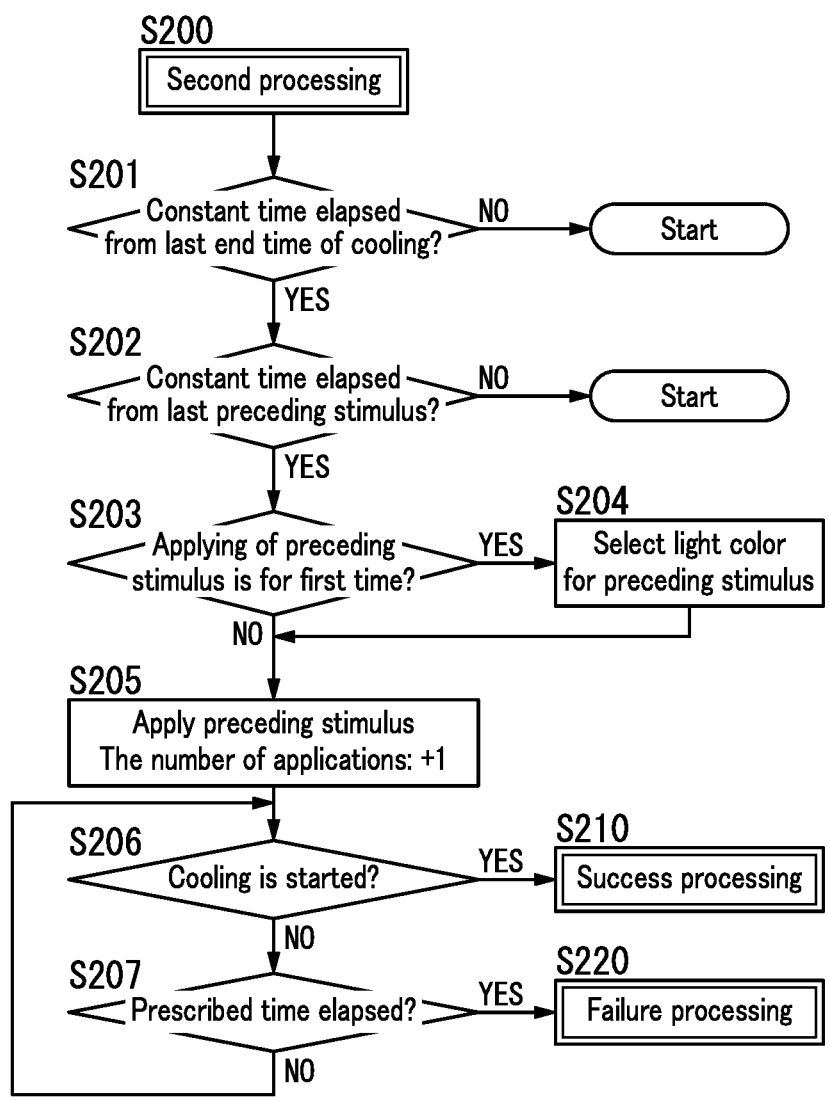
FIG. 6 is a flowchart showing an exemplary second processing in the conditioning system.

As illustrated in FIG. 6, in the second processing (in S200), the prediction unit 11 first determines whether or not a constant time elapses from the last end time of the cooling (in S201). The processing steps S201 is performed to exclude a case that the cooling was being used until immediately before performing of the second processing. If the constant time elapses from the last end time (if the answer is Yes in S201), the prediction unit 11 determines whether or not a constant time elapses from the last application time of the preceding stimulus (in S202). The processing steps S202 is performed to exclude a case that the preceding stimulus was being applied to the user U1 until immediately before performing of the second processing. If the constant time elapses from the last application time (if the answer is Yes in S202), the prediction unit 11 predicts that the event of the "starting of cooling" will occur. In the second processing, when the preceding stimulus is applied to the user U1 for the first time, the prediction unit 11 regards that the constant time elapses.

When the prediction unit 11 predicts that the event of the "starting of cooling" will occur, the stimulus applying unit 12 determines whether or not the preceding stimulus is applied to the user U1 for the first time now (in S203). If applying of the preceding stimulus is for the first time (if the answer is Yes in S203), the stimulus applying unit 12 selects a light color of light to be radiated from the lighting system 31, as the preceding stimulus (in S204). The light color selected herein is different from the light color selected in the case that the event is the "starting of heating." If applying of the preceding stimulus is NOT for the first time (if the answer is No in S203), or if applying of the preceding stimulus is for the first time and the light color has been selected, the stimulus applying unit 12 controls the lighting system 31 to apply the preceding stimulus to the user U1 by radiating the light with the light color, as the preceding stimulus, to the user U1 (in S205). At this time, the determining unit 13 increments the number of applications of the preceding stimulus regarding the event of the "starting of cooling" in the user information of the user U1 (in S205).

After that, when the ACC power supply or the IG power supply of the vehicle 7 is turned on and the cooling is started in accordance with the automatic mode or the manual operation for starting the cooling, received from the user U1 (if the answer is Yes in S206), the determining unit 13 determines that the trial for conditioning the preceding stimulus and the event has been succeeded, and then the conditioning system 100 performs the success processing (in S210). On the other hand, if the prescribed time elapses without the cooling being started (if the answer is No in S206, and Yes in S207), the determining unit 13 determines that the trial for conditioning the preceding stimulus and the event has been failed, and then the conditioning system 100 performs the failure processing (in S220).

In each of the processing steps S201 and S202, if a corresponding condition is NOT satisfied, the common processing is repeated without shifting to any of the success processing (in S210) and the failure processing (in S220).

Figure 7A:
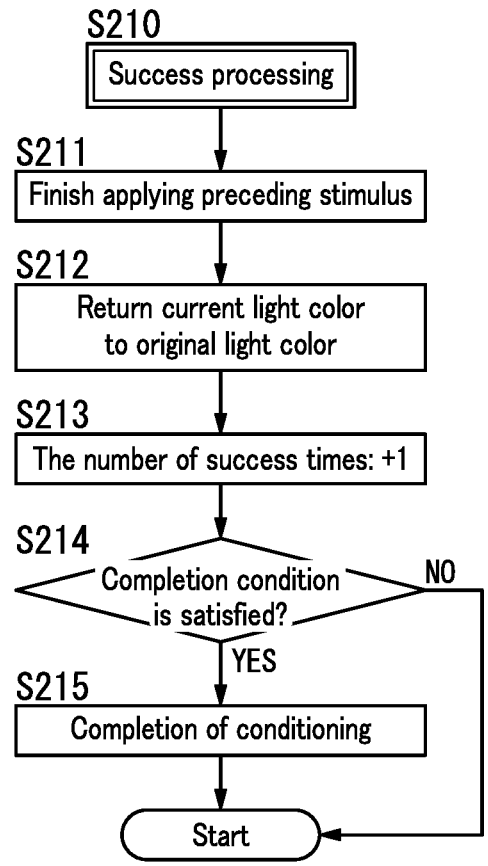
FIG. 7A is a flowchart showing an exemplary success processing of the second processing in the conditioning system.

As illustrated in FIG. 7A, in the success processing (in S210), the stimulus applying unit 12 controls, at a timing when the event is started, the lighting system 31 to finish (stop) applying the preceding stimulus to the user U1 (in S211). That is to say, the stimulus applying unit 12 controls the lighting system 31 to return the current light color to the original light color (the light color in the normal state) (in S212). At this time, the determining unit 13 increments the number of success times regarding the event of the "starting of cooling" in the user information of the user U1 (in S213). Alternatively, the stimulus applying unit 12 may control the lighting system 31 to finish the preceding stimulus before the timing when the event is started, and in this case, may shift to waiting condition determination of the processing steps S206 and S207 in a state where the preceding stimulus is finished.

The determining unit 13 then determines whether or not a completion condition for the conditioning is satisfied with reference to the user information of the user U1 (in S214). The "completion condition" mentioned herein is a condition that the number of success times is equal to or more than the prescribed number of times (e.g., 50 times) and furthermore the success rate is equal to or more than a prescribed value (e.g., 80%), for example. If the completion condition is satisfied (the answer is Yes in S214), the determining unit 13 determines that the conditioning regarding the event of the "starting of cooling" has been completed (in S215). At this time, the determining unit 13 allows the storage unit 5 to store, as the conditioning data hereinafter, the user information of the user U1 that the conditioning regarding the event of the "starting of cooling" has been completed.

Figure 7B:
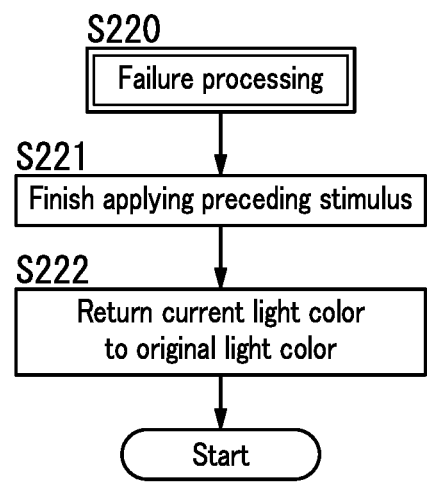
FIG. 7B is a flowchart showing an exemplary failure processing of the second processing in the conditioning system.

As illustrated in FIG. 7B, in the failure processing (in S220), the stimulus applying unit 12 controls, after the prescribed time elapsed, the lighting system 31 to finish (stop) applying the preceding stimulus to the user U1 (in S221). That is to say, the stimulus applying unit 12 controls the lighting system 31 to return the current light color to the original light color (the light color in the normal state) (in S222).

After the success processing (in S210) or the failure processing (in S220) is performed, the common processing is repeated.

In the processing steps S206 to S222 described above, radiation of light with the light color as the preceding stimulus is finished immediately, after the prescribed time elapses from start of applying the preceding stimulus, or after the event (cooling) is started. The preceding stimulus may be finished by a time shorter than the prescribed time, if it is a stimulus which can be perceived by the user U1.

(3.1.4) Third Processing

Figure 8:
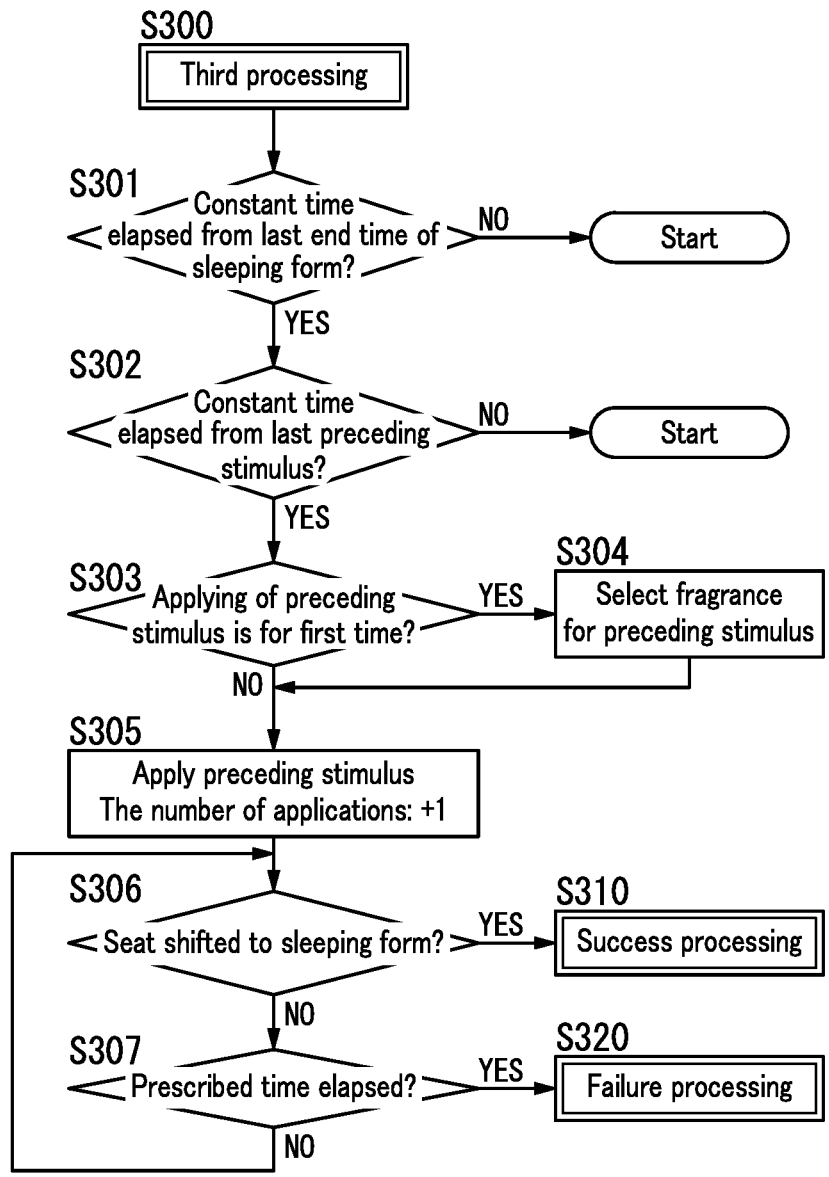
FIG. 8 is a flowchart showing an exemplary third processing in the conditioning system.

As illustrated in FIG. 8, in the third processing (in S300), the prediction unit 11 first determines whether or not a constant time elapses from the last end time of the sleeping form of the seat 72 (in S301). The processing steps S301 is performed to exclude a case that the seat 72 was being used in the sleeping form until immediately before performing of the third processing. If the constant time elapses from the last end time (if the answer is Yes in S301), the prediction unit 11 determines whether or not a constant time elapses from the last application time of the preceding stimulus (in S302). The processing steps S302 is performed to exclude a case that the preceding stimulus was being applied to the user U1 until immediately before performing of the third processing. If the constant time elapses from the last application time (if the answer is Yes in S302), the prediction unit 11 predicts that the event of the "shifting to the sleeping form" will occur. In the third processing, when the preceding stimulus is applied to the user U1 for the first time, the prediction unit 11 regards that the constant time elapses.

When the prediction unit 11 predicts that the event of the "shifting to the sleeping form" will occur, the stimulus applying unit 12 determines whether or not the preceding stimulus is applied to the user U1 for the first time now (in S303). If applying of the preceding stimulus is for the first time (if the answer is Yes in S303), the stimulus applying unit 12 selects a fragrance of the fragrance substances to be sprayed by the fragrance generating system 32, as the preceding stimulus (in S304). If applying of the preceding stimulus is NOT for the first time (if the answer is No in S303), or if applying of the preceding stimulus is for the first time and the fragrance has been selected, the stimulus applying unit 12 controls the fragrance generating system 32 to apply the preceding stimulus to the user U1 by spraying the fragrance substances with the fragrance, as the preceding stimulus, to the user U1 (in S305). At this time, the determining unit 13 increments the number of applications of the preceding stimulus regarding the event of the "shifting to the sleeping form" in the user information of the user U1 (in S305).

After that, if the seat 72 is shifted to the sleeping form in accordance with that the user U1 performs the manual operation for shifting the seat 72 to the sleeping form (if the answer is Yes in S306), the determining unit 13 determines that the trial for conditioning the preceding stimulus and the event has been succeeded, and then the conditioning system 100 performs the success processing (in S310). On the other hand, if the prescribed time elapses without the seat 72 being shifted to the sleeping form (if the answer is No in S306, and Yes in S307), the determining unit 13 determines that the trial for conditioning the preceding stimulus and the event has been failed, and then the conditioning system 100 performs the failure processing (in S320).

In each of the processing steps S301 and S302, if a corresponding condition is NOT satisfied, the common processing is repeated without shifting to any of the success processing (in S310) and the failure processing (in S320).

Figure 9A:
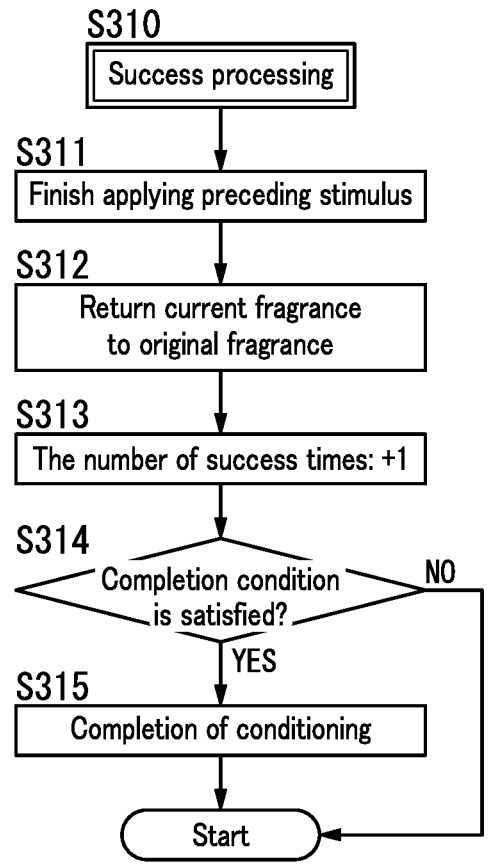
FIG. 9A is a flowchart showing an exemplary success processing of the third processing in the conditioning system.

As illustrated in FIG. 9A, in the success processing (in S310), the stimulus applying unit 12 controls, at a timing when the event occurs, the fragrance generating system 32 to finish (stop) applying the preceding stimulus to the user U1 (in S311). That is to say, the stimulus applying unit 12 controls the fragrance generating system 32 to return the current fragrance to the original fragrance (the fragrance in the normal state) (in S312). At this time, the determining unit 13 increments the number of success times regarding the event of the "shifting to the sleeping form" in the user information of the user U1 (in S313). Alternatively, the stimulus applying unit 12 may control the fragrance generating system 32 to finish the preceding stimulus before the timing when the event occurs, and in this case, may shift to waiting condition determination of the processing steps S306 and S307 in a state where the preceding stimulus is finished.

The determining unit 13 then determines whether or not a completion condition for the conditioning is satisfied with reference to the user information of the user U1 (in S314). The "completion condition" mentioned herein is a condition that the number of success times is equal to or more than the prescribed number of times (e.g., 50 times) and furthermore the success rate is equal to or more than a prescribed value (e.g., 80%), for example. If the completion condition is satisfied (the answer is Yes in S314), the determining unit 13 determines that the conditioning regarding the event of the "shifting to the sleeping form" has been completed (in S315). At this time, the determining unit 13 allows the storage unit 5 to store, as the conditioning data hereinafter, the user information of the user U1 that the conditioning regarding the event of the "shifting to the sleeping form" has been completed.

Figure 9B:
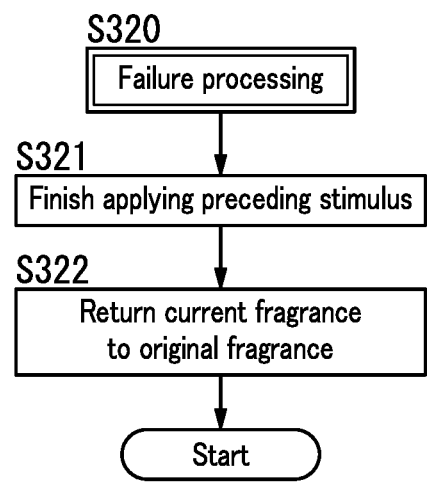
FIG. 9B is a flowchart showing an exemplary failure processing of the third processing in the conditioning system.

As illustrated in FIG. 9B, in the failure processing (in S320), the stimulus applying unit 12 controls, after the prescribed time elapsed, the fragrance generating system 32 to finish (stop) applying the preceding stimulus to the user U1 (in S321). That is to say, the stimulus applying unit 12 controls the fragrance generating system 32 to return the current fragrance to the original fragrance (the fragrance in the normal state) (in S322).

After the success processing (in S310) or the failure processing (in S320) is performed, the common processing is repeated.

In the processing steps S306 to S322 described above, spraying the fragrance substances with the fragrance as the preceding stimulus is finished immediately, after the prescribed time elapses from start of applying the preceding stimulus, or after the event (shifting to the sleeping form) occurs. The preceding stimulus may be finished by a time shorter than the prescribed time, if it is a stimulus which can be perceived by the user U1.

(3.2) Operation of Stimulus Applying System

Next, one example about how the stimulus applying system 200 operates will be described. The stimulus applying system 200 is operated after the conditioning data is generated by the conditioning system 100. The operation of the stimulus applying system 200 is common to the operation of the conditioning system 100, except for processing performed before generation of the conditioning data. The "processing performed before generation of the conditioning data" mentioned herein includes the success processing (in S110) and failure processing (in S120) of the first processing, the success processing (in S210) and failure processing (in S220) of the second processing, and the success processing (in S310) and failure processing (in S320) of the third processing. Accordingly, the stimulus applying system 200 performs a processing of finishing (stopping) applying of the preceding stimulus, and a processing of returning the current light color (or the current fragrance) to the original, instead of the success processings (S110, S210 and S310) and the failure processings (S120, S220 and S320).

More specifically the stimulus applying system 200 in the common processing estimates which of the events: "starting of heating", "starting of cooling" and "shifting to the sleeping form" may occur. When the estimation result indicates that the event of "starting of heating" may occur, the stimulus applying system 200 further predicts, based on the first processing, whether the event of "starting of heating" occurs. If the occurrence of the event (heating) is predict, the stimulus applying system 200 applies the preceding stimulus to the user U1 before the occurrence of the event (heating). Similarly, when the estimation result indicates that the event of "starting of cooling" may occur, the stimulus applying system 200 further predicts, based on the second processing, whether the event of "starting of cooling" occurs. If the occurrence of the event (cooling) is predicted, the stimulus applying system 200 applies the preceding stimulus to the user U1 before the occurrence of the event (cooling). Still similarly, when the estimation result indicates that the event of "shifting to the sleeping form" may occur, the stimulus applying system 200 further predicts, based on the third processing, whether the event of "shifting to the sleeping form" occur. If the occurrence of the event (sleeping form) is predicted, the stimulus applying system 200 applies the preceding stimulus to the user U1 before the occurrence of the event (sleeping form).

As described above, this embodiment contributes to making the user U1 actually feel that the reward is obtained by occurrence of the event at a stage before the event occurs, by applying the preceding stimulus to the user U1 before the event occurs. Therefore, in this embodiment, applying continuously to the user U1 a stimulus separately from the preceding stimulus is not needed. As a result, this embodiment has the advantages of increasing the chances of giving a desired effect (reward) to the user U1 while reducing a load on a system (the conditioning system 100 and the stimulus applying system 200). Furthermore, in this embodiment, the system (the conditioning system 100 and the stimulus applying system 200) can control such that the number of times applying a stimulus with respect to perception of the user U1 is set to only one time within a prescribed time unit. Thus, this embodiment has the advantages of antecedently giving an effect similar to that of the case where the reward is obtained to the user U1 by the effect of the conditioning in the system, while reducing the frequency of the stimulus and the continuation time of the stimulus with respect to the perception of the user U1, applied by the system.

Also when the user U1 is a driver of the vehicle 7 for example, this embodiment contributes to antecedently giving an effect similar to that of the case where the reward in accordance with occurrence of the event is obtained without the preceding stimulus preventing the user U1 from performing a driving operation or a preparation operation before driving. Thus, this embodiment has the advantages of increasing the chances of giving to the user U1 a secure feeling for that the reward is obtained. In other words, this embodiment has the advantages of easily reducing so-called "driver distraction."

The "driver distraction" means that the driver's consciousness is turned to the matter other than the driving operation and the performance of the driver's driving operation is accordingly reduced. The driver distraction may be caused by a conversation with a passenger, an inattentive driving, an operation to a car navigation system, an operation to an audio system or an operation to the air conditioning system 41, as one example.

As described above, this embodiment utilizes the reward system for the brain of the user U1 (the driver herein), which can make the user U1 actually feel the space state in the vehicle 7 after the user U1 starts the driving operation or the preparation operation before driving, even before the user U1 starts them. Thus, this embodiment contributes to reducing the chances that the consciousness of the user U1 is turned to the air conditioning system 41, while the user U1 performs the driving operation or the preparation operation before driving. As a result, this embodiment has the advantages of reducing occurrence of the driver distraction.

Also it is brain-scientifically proved that, after completion of the conditioning, the user U1 feels an effect similar to that of the reward at a timing when the preceding stimulus is applied. Accordingly, in this embodiment, the user U1 feels the light as the preceding stimulus, and therefore can feel the effect by the air conditioning system 41 at the timing when the preceding stimulus is applied. Thus, this embodiment has the advantages of reducing the chances that the user U1 feels uncomfortable even if the effect by the air conditioning system 41 is not obtained in the prescribed time from a time point when the air conditioning system 41 is actually activated.

Also in this embodiment, occurrence of the event within the prescribed time is predicted, and applying of the preceding stimulus is stopped quickly, when the event occurs or before the event occurs. It is brain-scientifically proved that the effect of the conditioning cannot be sufficiently obtained in a case that the reward is acquired (the event) after the prescribed time elapses from when the preceding stimulus occurs, or in a case that the preceding stimulus occurs after the reward is acquired (the event) (see Sho Yagishita et al. "A Critical Time Window for Dopamine Actions on the Structural Plasticity of Dendritic Spines", DOI number; 10.1126/science. 1255514). Accordingly, this embodiment has the advantages of enhancing the effect of the conditioning, by properly applying the preceding stimulus as above, and easily avoiding the driver distraction due to that the preceding stimulus is continuously applied, by not applying an unnecessary stimulus.

(4) Variations

The exemplary embodiment described above is only an exemplary one of various embodiments of the present disclosure and should not be construed as limiting. The exemplary embodiment may be readily modified in various manners depending on a design choice or any other factor, as long as the purpose of the present disclosure can be attained. The functions similar to the conditioning system 100 may also be implemented as, for example, a conditioning method, a (computer) program, or a non-transitory storage medium that stores the computer program. Also the functions similar to the stimulus applying system 200 may also be implemented as, for example, a stimulus applying method, a (computer) program, or a non-transitory storage medium that stores the computer program.

A conditioning method according to an aspect includes a prediction step and a stimulus applying step. The prediction step includes predicting, based on a state related to a user U1, an occurrence of an event to be caused by the state related to the user U1. The stimulus applying step includes applying, when in the prediction step it is predicted that the event occurs in future, a stimulus associated with the event to the user in advance of the event. A program according to an aspect is designed to cause one or more processors to perform the conditioning method described above.

A stimulus applying method according to an aspect includes a prediction step and a stimulus applying step. The prediction step includes predicting, based on a state related to a user U1, an occurrence of an event to be caused by the state related to the user U1. The stimulus applying step includes applying, when in the prediction step it is predicted that the event occurs in future, based on a conditioning data where the event and a stimulus are conditioned, the stimulus conditioned to the event to the user in advance of the event. A program according to an aspect is designed to cause one or more processors to perform the stimulus applying method described above.

Hereinafter, variations of the exemplary embodiment described above will be listed. The variations to be described below may be adopted in combination with the exemplary embodiment described above as appropriate.

The conditioning system 100 and the stimulus applying system 200 according to the present disclosure include a computer system in the processing unit 1 and the like, for example. The computer system may include a processor and a memory as principal hardware components. The functions of the conditioning system 100 and the stimulus applying system 200 according to the present disclosure may be performed by making the processor execute a program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be implemented as a single or a plurality of electronic circuits including a semiconductor integrated circuit (IC) or a large-scale integrated circuit (LSI). As used herein, the "integrated circuit" such as an IC or an LSI is called by a different name depending on the degree of integration thereof. Examples of the integrated circuits include a system LSI, a very large-scale integrated circuit (VLSI), and an ultra-large scale integrated circuit (ULSI). Optionally, a field-programmable gate array (FPGA) to be programmed after an LSI has been fabricated or a reconfigurable logic device allowing the connections or circuit sections inside of an LSI to be reconfigured may also be adopted as the processor. Those electronic circuits may be either integrated together on a single chip or distributed on multiple chips, whichever is appropriate. Those multiple chips may be integrated together in a single device or distributed in multiple devices without limitation. As used herein, the "computer system" includes a microcontroller including one or more processors and one or more memories. Thus, the microcontroller may also be implemented as a single or a plurality of electronic circuits including a semiconductor integrated circuit or a large-scale integrated circuit.

Also, the plurality of functions of the conditioning system 100 are integrated together in a single housing, but this is not an essential configuration for the conditioning system 100. Alternatively, the plurality of functions of the conditioning system 100 may be distributed in multiple different housings. Still alternatively, at least some functions of the conditioning system 100 (e.g., some functions) may be implemented as a cloud computing system as well. Conversely, the plurality of functions of the conditioning system 100 may be integrated together in a single housing, as the basic example. The stimulus applying system 200 is also the same.

In the above-mentioned embodiment, the processing unit 1 may individually control the air conditioning system 41 and the seat control system 42 by sending commands to them, respectively. That is to say, the processing unit 1 may function as an environment controller 2 configured to control the environment providing system 4. In other words, the conditioning system 100 may further include the environment controller 2.

In the above-mentioned embodiment, when the conditioning has been completed in the conditioning system 100, the system may reduce the threshold regarding the event that the conditioning has been completed. That is to say, a prediction condition used by the prediction unit 11 to predict that the event occurs in future may be looser than the prediction condition used before generation of the conditioning data (i.e., the prediction condition in the conditioning system 100).

In the above-mentioned embodiment, a time interval from applying of the preceding stimulus to occurrence of the event in the stimulus applying system 200 may be longer than that in the conditioning system 100. That is to say, the stimulus applying unit 12 starts applying the stimulus (preceding stimulus) to the user U1 within a prescribed time from a start time point of the event predicted. The prescribed time may be longer than the prescribed time before the generation of the conditioning data (i.e., the prescribed time in the conditioning system 100).

In the above-mentioned embodiment, the stimulus applying system 200 may be configured not to apply the preceding stimulus to the user U1 in the environment where the reward cannot be given to the user U1, such as the failure state of the air conditioning system 41. In other words, in the stimulus applying system 200, the stimulus applying unit 12 may be configured not to apply the stimulus (preceding stimulus) to the user when no occurrence of the event is predicted.

In the above-mentioned embodiment, the prediction unit 11 may predict occurrence of the event of the "shifting to the sleeping form" not only in the back seat 72 but also in the driver seat 72 or the passenger seat 72. As one example, when predicting whether or not the "shifting to the sleeping form" occurs in the driver seat 72, the prediction unit 11 may regard the following matter as one condition for occurrence of the event. More specifically, the one condition for occurrence of the event may be to detect, using a positioning system such as a Global Positioning System (GPS), movement of the vehicle 7 into an area such as a service area where the user U1 (driver) can stop driving and rest.

In the above-mentioned embodiment, the preceding stimulus may be applied to the user U1 from a portable terminal such as a wearable terminal or a smart phone, which is always carried by the user U1 with a high probability. In this case, the prediction result of the prediction unit 11 is transmitted to the portable terminal. The stimulus applying unit 12 provided for the portable terminal outputs a certain sound from the portable terminal to apply the preceding stimulus to the user U1, if occurrence of the event is predicted based on the prediction result of the prediction unit 11, for example. In other words, the portable terminal may have a function as the stimulus applying unit 12.

In the above-mentioned embodiment, the user information (including the conditioning data) is stored in the storage unit 5. However, that is only an example and should not be construed as limiting. The user information may be stored in a cloud computing system. In this aspect, even when the vehicle 7 is changed to another vehicle (e.g., a new vehicle 7 purchased by the user U1), the user information is easily extracted from the cloud computing system, which can apply the preceding stimulus to the user U1 also in the new vehicle 7, like in the vehicle 7 previously used. This aspect can be adopted also to a case where the user U1 utilizes a car sharing system and changes the vehicle 7 every use.

In the above-mentioned embodiment, the stimulus applying unit 12 may change a mode of the preceding stimulus to be applied to the user U1, when the number of times the trial for conditioning is failed reaches prescribed times. For example, when the preceding stimulus previously applied is light with a certain light color, the stimulus applying unit 12 may change the light color to the other color or change the preceding stimulus to the other kind of preceding stimulus (e.g., fragrance).

In the above-mentioned embodiment, even when the event occurs within the prescribed time from when the preceding stimulus is applied to the user U1, the user U1 may take action of repelling the preceding stimulus. In such a case, the determining unit 13 may determine that the trial for the conditioning has been failed. For example, when the preceding stimulus is light, the above action may correspond to that the user U1 turns off lighting, or that the user U1 has a look showing a sense of dislike on his/her face (e.g., being dazzled by a glare). Also when the preceding stimulus is a fragrance, the above action may correspond to that the user U1 opens a window of the vehicle 7, or that the user U1 has a look showing a sense of dislike on his/her face (e.g., making a wry face). Whether or not the user U1 is showing a sense of dislike may be determined by utilizing the technology for estimating feelings of the user U1. The estimation algorithm using a two-dimensional model regarding human feelings (called Russell's circumplex model) may be adopted for the estimating the feelings of the user U1, for example.

In the above-mentioned embodiment, the event associated with the preceding stimulus to be applied to the user U1 is not limited to being previously set. For example, the conditioning system 100 and the stimulus applying system 200 may collect data about behaviors taken by the user U1 after applying the preceding stimulus, and predict, based on the data collected, the event that should be associated with the preceding stimulus.

In the above-mentioned embodiment, the preceding stimulus may be an arbitrary stimulus, as long as it be associated with the event in one-to-one. For example, when the preceding stimulus is light, its light color is not limited to a certain color. As one example, when the event is the "starting of heating", the light color is not limited to warm colors such as an orange color, from which warmth is easily associated. The light color may be a color other than the warm colors. Thus, for example even when the user sets the warm colors as the light color in the normal state for the vehicle 7, light with a light color different from that set by the user can be also used as the preceding stimulus.

In the above-mentioned embodiment, the preceding stimulus is not limited in particular, as long as it is appealed to the user's senses. For example, even when the light color is the same as that in the normal state, the light radiated by the lighting system 31 can be applied as the preceding stimulus by repeating flashing or setting its illuminance to be higher than that in the normal state. Alternatively, the preceding stimulus may be a stimulus to be appealed to the sense of touch, a sound to be appealed to the sense of hearing, or an image to be appealed to the visual senses, of the user U1.

In the above-mentioned embodiment, the preceding stimulus before the conditioning is performed is not limited to being directly associated with the reward with respect to the user U1, as long as the user can be made actually feel that the reward is obtained in future by the preceding stimulus even when the user feels uncomfortable immediately after the preceding stimulus is applied to the user U1.

In the above-mentioned embodiment, the conditioning system 100 and the stimulus applying system 200 predict occurrences of the two or more events and applies to the user U1 the preceding stimuli respectively associated with the events of which occurrences are predicted. However, this aspect is only an example and should not be construed as limiting. For example, the conditioning system 100 and the stimulus applying system 200 may be configured to predict occurrence of at least one of the two or more events and apply to the user U1 the preceding stimulus associated with the at least one of which occurrence is predicted.

In the above-mentioned embodiment, the conditioning system 100 and the stimulus applying system 200 are applied for the vehicle 7. However, that is only an example and should not be construed as limiting. That is to say, the conditioning system 100 and the stimulus applying system 200 can be applied for various environments, as long as the event can be predicted to occur and furthermore the stimuli to the user U1 and the events can be conditioned in one-to-one. For example, the conditioning system 100 and the stimulus applying system 200 may be applied for facilities such as residences.

As one example, a case that the conditioning system 100 and the stimulus applying system 200 are applied for a detached residence will be described. First, as a premise, it is assumed that the user U1 (resident) manually activates an air conditioning system via a communication network from outdoor, or the system estimates that the user U1 will get home and automatically activates the air conditioning system, and the environment in the detached residence is accordingly in a comfortable state by the air conditioning system when the user U1 actually gets home. In this case, the preceding stimulus is conditioned to the pleasure (reward) to be obtained by the air conditioning system when the user U1 enters the residence by applying the preceding stimulus when the user U1 (resident) opens the front door of the residence. Repeating this can brain-scientifically make the user U1 taking in advance the pleasure, which will be obtained by the air conditioning system, and give to the user U1 a secure feeling for entering a room where the air conditioning system is operating by only the preceding stimulus applied when the user U1 opens the front door. That is to say, the preceding stimulus applied when the user U1 opens the front door can make the user U1 actually feel the pleasure (reward) to be obtained by the air conditioning.

In the aspect (for the residence) described above, the conditioning system 100 and the stimulus applying system 200 may be configured to control such that, if the air conditioning of an entrance area in the residence is in comfortable state, a timing of applying the preceding stimulus to be when the user U1 approaches to the entrance area. Also the conditioning system 100 and the stimulus applying system 200 may be configured to control such that, if only the air conditioning of a room away from the entrance area is in comfortable state, the timing to be when the user U1 enters the entrance area. The aspect can adjust a time interval between the preceding stimulus and occurrence of the event to increase a successful probability of the conditioning.

(Recapitulation)

As can be seen from the foregoing description, a conditioning system (100) according to a first aspect includes a prediction unit (11) and a stimulus applying unit (12). The prediction unit (11) is configured to predict, based on a state related to a user (U1), an occurrence of an event to be caused by the state related to the user (U1). The stimulus applying unit (12) is configured to apply, when the prediction unit (11) predicts that the event occurs in future, a stimulus associated with the event to the user (U1) in advance of the event. The event may preferably be an event by which the user (U1) can obtain a reward.

The first aspect has the advantages of increasing the chances of giving a desired effect to the user (U1) while reducing a load on a system.

A conditioning system (100) according to a second aspect, which may be implemented in conjunction with the first aspect, further includes a determining unit (13). The determining unit (13) is configured to determine whether or not the event occurs, after the stimulus is applied to the user (U1) by the stimulus applying unit (12).

In the second aspect, whether or not the trial for conditioning the event and the stimulus is succeeded can be determined. Consequently, the second aspect has the advantages of increasing the chances of grasping about whether or not the conditioning is completed based on a determination result of the determining unit (13).

In a conditioning system (100) according to a third aspect, which may be implemented in conjunction with the first aspect or the second aspect, the stimulus applying unit (12) is configured to start applying the stimulus to the user (U1) before a prescribed time with respect to a start time point of the event predicted.

The third aspect has the advantages of further increasing the chances of conditioning the stimulus and the event, compared with a case of applying the stimulus to the user (U1) after the prescribed time from the start time point of the event predicted.

In a conditioning system (100) according to a fourth aspect, which may be implemented in conjunction with the fourth aspect, the prescribed time is set within a range of 0.1 seconds to 10.0 seconds.

In a conditioning system (100) according to a fifth aspect, which may be implemented in conjunction with any one of the first to fourth aspects, the stimulus applying unit (12) is configured to change the stimulus to be applied to the user (U1) in accordance with a kind of the event.

The fifth aspect has the advantages of increasing the chances of applying an appropriate stimulus to the user (U1) in accordance with the kind of the event.

A conditioning system (100) according to a sixth aspect, which may be implemented in conjunction with any one of the first to fifth aspects, further includes an identifying unit (14) configured to identify the user (U1). The stimulus applying unit (12) is configured to change the stimulus to be applied per user (U1) in accordance with an identification result of the identifying unit (14).

The sixth aspect has the advantages of increasing the chances of applying an appropriate stimulus per user (U1).

In a conditioning system (100) according to a seventh aspect, which may be implemented in conjunction with any one of the first to sixth aspects, the stimulus applying unit (12) is configured to stop applying the stimulus, after elapse of a prescribed time from starting of applying the stimulus to the user (U1), or at a timing of an occurrence of the event.

The seventh aspect has the advantages of increasing the chances of providing an environment that the stimulus and the event are easily conditioned, and further reducing the frequency of the stimulus and the continuation time of the stimulus with respect to the perception of the user (U1).

A conditioning system (100) according to an eighth aspect, which may be implemented in conjunction with any one of the first to seventh aspects, further includes an environment controller (2) configured to control an environment providing system (4) that provides an environment inducing the event.

The eighth aspect has the advantages of increasing the chances of providing an environment that the stimulus and the event are easily conditioned.

A stimulus applying system (200) according to a ninth aspect includes a prediction unit (11) and a stimulus applying unit (12). The prediction unit (11) is configured to predict, based on a state related to a user (U1), an occurrence of an event to be caused by the state related to the user (U1). The stimulus applying unit (12) is configured to apply, when the prediction unit (11) predicts that the event occurs in future, based on a conditioning data where the event and a stimulus are conditioned, the stimulus conditioned to the event to the user (U1) in advance of the event. The event may preferably be an event by which the user (U1) can obtain a reward.

The ninth aspect has the advantages of increasing the chances of giving a desired effect to the user (U1) while reducing a load on a system.

In a stimulus applying system (200) according to a tenth aspect, which may be implemented in conjunction with the ninth aspect, a prediction condition used by the prediction unit (11) to predict that the event occurs in future is looser than the prediction condition used before generation of the conditioning data.

The tenth aspect contributes to increasing the chances of predicting occurrence of the event. Consequently, the ninth aspect has the advantages of reducing leakage of applying the stimulus to the user (U1).

In a stimulus applying system (200) according to an eleventh aspect, which may be implemented in conjunction with the ninth aspect or the tenth aspect, the stimulus applying unit (12) is configured to start applying the stimulus to the user (U1) within a prescribed time from a start time point of the event predicted. The prescribed time after the generation of the conditioning data is longer than the prescribed time before the generation of the conditioning data.

The eleventh aspect has the advantages of increasing an influence time to the user (U1) by the stimulus after the generation of the conditioning data, while enhancing the success rate for the conditioning before the generation of the conditioning data.

In a stimulus applying system (200) according to a twelfth aspect, which may be implemented in conjunction with the eleventh aspect, the prescribed time is set within a range of 0.1 seconds to 10.0 seconds.

A stimulus applying system (200) according to a thirteenth aspect, which may be implemented in conjunction with any one of the ninth to twelfth aspects, further includes an identifying unit (14) configured to identify the user (U1). The stimulus applying unit (12) is configured to change the stimulus to be applied per user (U1) in accordance with an identification result of the identifying unit (14).

The thirteenth aspect has the advantages of increasing the chances of applying an appropriate stimulus per user (U1).

In a stimulus applying system (200) according to a fourteenth aspect, which may be implemented in conjunction with any one of the ninth to thirteenth aspects, the stimulus applying unit (12) is configured not to apply the stimulus to the user (U1) when no occurrence of the event is predicted.

The fourteenth aspect can prevent an unnecessary stimulus from being applied to the user (U1). Consequently, the twelfth aspect has the advantages of suppressing the conditioning between the stimulus and the event from being weaken.

A conditioning method according to a fifteenth aspect includes a prediction step and a stimulus applying step. The prediction step includes predicting, based on a state related to a user (U1), an occurrence of an event to be caused by the state related to the user (U1). The stimulus applying step includes applying, when in the prediction step it is predicted that the event occurs in future, a stimulus associated with the event to the user (U1) in advance of the event. The event may preferably be an event by which the user (U1) can obtain a reward.

The fifteenth aspect has the advantages of increasing the chances of giving a desired effect to the user (U1) while reducing a load on a system.

A program according to a sixteenth aspect is designed to cause one or more processors to perform the conditioning method of the fifteenth aspect. The program according to the sixteenth aspect may be stored in a non-transitory storage medium.

The sixteenth aspect has the advantages of increasing the chances of giving a desired effect to the user (U1) while reducing a load on a system.

A stimulus applying method according to a seventeenth aspect includes a prediction step and a stimulus applying step. The prediction step includes predicting, based on a state related to a user (U1), an occurrence of an event to be caused by the state related to the user (U1). The stimulus applying step includes, when in the prediction step it is predicted that the event occurs in future, applying, based on a conditioning data where the event and a stimulus are conditioned, the stimulus conditioned to the event to the user (U1) in advance of the event. The event may preferably be an event by which the user (U1) can obtain a reward.

The seventeenth aspect has the advantages of increasing the chances of giving a desired effect to the user (U1) while reducing a load on a system.

A program according to an eighteenth aspect is designed to cause one or more processors to perform the stimulus applying method of the seventeenth aspect. The program according to the eighteenth aspect may be stored in a non-transitory storage medium.

The eighteenth aspect has the advantages of increasing the chances of giving a desired effect to the user (U1) while reducing a load on a system.

A mobile object (7) according to a nineteenth aspect includes the conditioning system (100) of any one of the first to eighth aspects and a main body (70) where the conditioning system (100) is provided.

The nineteenth aspect has the advantages of increasing the chances of giving a desired effect to the user (U1) while reducing a load on a system.

A mobile object (7) according to a twentieth aspect includes the stimulus applying system (200) of any one of the ninth to fourteenth aspects and a main body (70) where the stimulus applying system (200) is provided.

The twentieth aspect has the advantages of increasing the chances of giving a desired effect to the user (U1) while reducing a load on a system.

Note that the constituent elements according to the second to eighth aspects are not essential constituent elements for the conditioning system (100) but may be omitted as appropriate. Also the constituent elements according to the tenth to fourteenth aspects are not essential constituent elements for the stimulus applying system (200) but may be omitted as appropriate.

In the conditioning system (100) of any one of the first to eighth aspects or the stimulus applying system (200) of any one of the ninth to fourteenth aspects, the stimulus may be light or fragrance.

In the conditioning system (100) of any one of the first to eighth aspects or the stimulus applying system (200) of any one of the ninth to fourteenth aspects, the event may be activation of the air conditioning system (41) (more specifically, starting of heating).

In the conditioning system (100) of any one of the first to eighth aspects or the stimulus applying system (200) of any one of the ninth to fourteenth aspects, the event may be entering a room that is in a comfortable state by the air conditioning being already operated, and the stimulus may be light or fragrance to be applied to the user (U1) at a timing when the user (U1) approaches a door of the room from outdoor, or when the user (U1) opens the door. In this case, the system is configured to apply the preceding stimulus to the user (U1) only in a case where the user (U1) obtains no effect of the air conditioning, which is the reward of the event, within the prescribed time, as the embodiment described above. As one use case, the user (U1) may previously activate the air conditioning in an interior of a vehicle (or a room of a residence), using a remote controller or the like from outdoor. Operating the conditioning system (100) of any one of the first to seventh aspects and the stimulus applying system (200) of any one of the eighth to twelfth aspects can apply to the user (U1) an effect similar to that of the air conditioning in advance, before the user (U1) entering the interior (or the room) that is in the comfortable state by the air conditioning being already operated.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The entire contents of International Application No. PCT/JP2020/007872 and Japanese Patent Application No. 2019-065088 mentioned above are incorporated herein by reference.

The invention claimed is:

1. A conditioning system, comprising a processor configured to implement:
a predictor configured to predict, based on a state related to a user in a vehicle, an occurrence of an event related to a vehicle control which is to be caused by the state related to the user and by which the user is to obtain a reward; and
a stimulus applicator configured to apply, when the predictor predicts that the event related to the vehicle control occurs in future, a stimulus previously associated with the event related to the vehicle control to the user at an earlier time than a time at which the event related to the vehicle control is predicted to occur.

2. The conditioning system of claim 1, further comprising the processor configured to implement a determiner configured to determine whether or not the event related to the vehicle control occurs after the stimulus is applied to the user.

3. The conditioning system of claim 2, wherein the determiner generates a conditioning data when the event related to the vehicle control and the stimulus are conditioned, and
the stimulus applicator applies, when the predictor predicts that the event related to the vehicle occurs in the future, the stimulus conditioned to the event related to the vehicle control to the user based on the conditioning data.

4. The conditioning system of claim 3, wherein
a threshold is used by the predictor to predict the event related to the vehicle control occurs in the future,
the predictor predicts that the event related to the vehicle control occurs in the future when a measured value representing the state related to the user is larger than the threshold, and
a first threshold that is a threshold before the generation of the conditioning data is larger than a second threshold that is a threshold after the generation of the conditioning data.

5. The conditioning system of claim 3, wherein
the stimulus applicator is configured to start applying the stimulus to the user within a first prescribed time from a start time point of the event related to the vehicle control predicted before generating the conditioning data,
the stimulus applicator to start applying the stimulus to the user within a second prescribed time from a start time point of the event related to the vehicle control predicted after generating the conditioning data, and
the second prescribed time is longer than the first prescribed time.

6. The conditioning system of claim 5, wherein the first prescribed time and the second prescribed time are set within a range of 0.1 seconds to 10.0 seconds.

7. The conditioning system of claim 3, further comprising an identifier configured to identify the user, wherein the stimulus applicator is configured to change the stimulus to be applied per user in accordance with an identification result of the identifier.

8. The conditioning system of claim 3, wherein the stimulus applicator is configured not to apply the stimulus to the user when no occurrence of the event related to the vehicle control is predicted.

9. The conditioning system of claim 1, wherein
the stimulus applicator starts applying the stimulus to the user before a prescribed time with respect to a starting time point of when the event related to the vehicle control is predicted.

10. The conditioning system of claim 9, wherein the prescribed time is set within a range of 0.1 seconds to 10.0 seconds.

11. The conditioning system of claim 1, wherein
the stimulus applicator is configured to change the stimulus to be applied to the user in accordance with a kind of the event related to the vehicle control.

12. The conditioning system of claim 1, further comprising the processor configured to implement an identifier configured to identify the user, wherein the stimulus applicator is configured to change the stimulus to be applied per user in accordance with an identification result from the identifier.

13. The conditioning system of claim 1, wherein the stimulus applicator is configured to stop applying the stimulus after an elapse of a prescribed time from starting of applying the stimulus to the user, or at a timing of an occurrence of the event related to the vehicle control.

14. The conditioning system of claim 1, further comprising the processor configured to implement an environment controller configured to control an environment providing system that provides an environment inducing the event related to the vehicle control.

15. The conditioning system of claim 1, wherein the stimulus applicator is configured to control a lighting system or a fragrance generating system to start applying the stimulus to the user.

16. The conditioning system of claim 15, wherein the stimulus is light or fragrance.

17. A conditioning method, comprising:
a prediction step including predicting, based on a state related to a user in a vehicle, an occurrence of an event related to a vehicle control which is to be caused by the state related to the user and by which the user is to obtain a reward; and
a stimulus applying step including applying, when the prediction step predicts that the event related to the vehicle control occurs in future, a stimulus previously associated with the event related to the vehicle control to the user at an earlier time than a time at which the event related to the vehicle control is predicted to occur.

18. A non-transitory storage medium that stores a program designed to cause one or more processors to perform the conditioning method of claim 17.

19. A mobile object, comprising:
the conditioning system of claim 1; and
a main body where the conditioning system is provided.

20. A mobile object, comprising:
the stimulus applying system of claim 3; and
a main body where the stimulus applying system is provided.

* * * * *